US012500025B2

(12) United States Patent
Maesawa et al.

(10) Patent No.: US 12,500,025 B2
(45) Date of Patent: Dec. 16, 2025

(54) COIL COMPONENT

(71) Applicant: SUMIDA CORPORATION, Tokyo (JP)

(72) Inventors: Sho Maesawa, Natori (JP); Takashi Haga, Natori (JP)

(73) Assignee: SUMIDA CORPORATION (JP)

( * ) Notice: Subject to any disclaimer, the term of this patent is extended or adjusted under 35 U.S.C. 154(b) by 958 days.

(21) Appl. No.: 17/678,091

(22) Filed: Feb. 23, 2022

(65) Prior Publication Data

US 2022/0277880 A1 Sep. 1, 2022

(30) Foreign Application Priority Data

Feb. 26, 2021 (JP) ................................ 2021-029944

(51) Int. Cl.

*H01F 27/32* (2006.01)
*H01F 27/02* (2006.01)

(Continued)

(52) U.S. Cl.

CPC ............. *H01F 27/02* (2013.01); *H01F 27/24* (2013.01); *H01F 27/2823* (2013.01);

(Continued)

(58) Field of Classification Search

CPC ...... H01F 27/02; H01F 27/24; H01F 27/2823; H01F 27/306; H01F 27/325;

(Continued)

(56) References Cited

U.S. PATENT DOCUMENTS 4,363,014 A 12/1982 Leach et al.
4,885,559 A 12/1989 Nakano (Continued)

FOREIGN PATENT DOCUMENTS

EP 3872821 A1 9/2021
JP S50-37848 U 4/1975

(Continued)

OTHER PUBLICATIONS

Office Action issued in the corresponding Japanese Patent Application No. 2021-029944; mailed on Sep. 3, 2024 (total 4 pages).

(Continued)

*Primary Examiner* — Mang Tin Bik Lian

(74) *Attorney, Agent, or Firm* — Harness, Dickey & Pierce, P.L.C.

(57) ABSTRACT

A coil component includes a bobbin, a magnetic core, a coil, and a cover member attached onto the bobbin along an attachment direction. One of the cover member and the bobbin has a spring piece. The spring piece elastically energizes the other of the cover member and the bobbin. The spring piece extends along the attachment direction and has one end, a contact part, an entering part, and a tip end. The other of the cover member and the bobbin has a convex part and a recessed part. The recessed part is closer to the tip end than the convex part. The contact part contacts and energizes the convex part. The entering part enters the recessed part. The spring piece is bent to generate an energizing force. The cover member energizes the bobbin upward at a contact position by the energizing force.

18 Claims, 13 Drawing Sheets

(51) Int. Cl.

| | |
|---|---|
| ***H01F 27/24*** | (2006.01) |
| ***H01F 27/28*** | (2006.01) |
| ***H01F 27/30*** | (2006.01) |
| ***H01F 41/06*** | (2016.01) |

(52) U.S. Cl.
CPC ......... *H01F 27/306* (2013.01); *H01F 27/325* (2013.01); *H01F 41/06* (2013.01)

(58) Field of Classification Search
CPC ........ H01F 27/027; H01F 27/022; H01F 5/02; H01F 2005/022; H01F 2005/025; H01F 2005/0027; H01F 2005/046; H01F 27/327
See application file for complete search history.

(56) References Cited

U.S. PATENT DOCUMENTS

| | | | | |
|---|---|---|---|---|
| 5,489,884 | A * | 2/1996 | Heringer | H01F 27/29 336/83 |
| 5,592,138 | A * | 1/1997 | Tobben | H01F 27/263 336/210 |
| 5,635,891 | A * | 6/1997 | Miyoshi | H01F 5/02 336/198 |
| 9,799,442 | B1 * | 10/2017 | Folker | H01F 41/0206 |
| 2002/0057163 | A1 * | 5/2002 | McGrane | H01F 27/02 336/90 |
| 2004/0102105 | A1 * | 5/2004 | Steiner | H01F 27/027 439/856 |
| 2005/0073385 | A1 * | 4/2005 | Wu | H01F 27/325 336/208 |
| 2005/0140485 | A1 * | 6/2005 | Chang | H01F 27/325 336/198 |
| 2011/0090037 | A1 * | 4/2011 | Tsai | H01F 27/324 336/220 |
| 2015/0325354 | A1 | 11/2015 | Sasaki | |
| 2017/0309393 | A1 | 10/2017 | Jung et al. | |
| 2019/0279808 | A1 * | 9/2019 | Yasuda | H01F 27/2804 |
| 2021/0265104 | A1 | 8/2021 | Maesawa et al. | |

FOREIGN PATENT DOCUMENTS

| | | | |
|---|---|---|---|
| JP | S63-39997 | U | 3/1988 |
| JP | 2008-187052 | A | 8/2008 |
| JP | 2014236128 | A | 12/2014 |
| JP | 7396110 | B2 | 9/2021 |
| WO | 2016-071098 | A2 | 5/2016 |

OTHER PUBLICATIONS

European Search Report issued for the corresponding European Patent Application No. 22158540.9; dated Jul. 20, 2022 (total 11 pages).

* cited by examiner

COIL COMPONENT

CROSS-REFERENCE TO RELATED APPLICATIONS

This application claims priority to Japanese Patent Application No. 2021-029944 filed Feb. 26, 2021 which is hereby expressly incorporated by reference herein in its entirety.

BACKGROUND

1. Technical Field

The present application relates to a coil component.

2. Related Art

For instance, there is a coil component that is described in Japanese Patent Publication Number 2014-236128.

The coil component that is described in Japanese Patent Publication Number 2014-236128 is configured with a bobbin part (described as "a bobbin" in Japanese Patent Publication Number 2014-236128), a coil, a magnetic core, and a cover member (described as "a case" in Japanese Patent Publication Number 2014-236128). Specifically, the coil is wound around the bobbin part. The magnetic core is inserted into the bobbin part. Further, the cover member covers the bobbin part.

According to the investigation of the inventors of the present application, there is room for improvement in the configuration of the coil component that is described in Japanese Patent Publication Number 2014-236128 from the view point that a positional relationship between the cover member and bobbin part is made to be a desired positional relationship.

SUMMARY

The present application attempts to solve the above problem and achieve the above improvement. An object of the present application is to provide a coil component that has a configuration that enables a desired positional relationship between a cover member and a bobbin part to be easily realized.

According to one aspect of the present application, a coil component includes a bobbin, a magnetic core that is inserted into the bobbin, a coil that is wound around the bobbin, and a cover member that is attached onto the bobbin along an attachment direction. At least one of the cover member and the bobbin has a spring piece. The spring piece of one of the cover member and the bobbin elastically energizes the other of the cover member and the bobbin along a first direction parallel to a mounting surface. The spring piece extends along the attachment direction and has one end and a tip end opposite to the one end. The spring piece has a cantilever structure in which the one end is supported. The spring piece further has a contact part and an entering part. The entering part is located closer to the tip end of the spring piece than the contact part. The entering part is located further in the first direction than the contact part. The other of the cover member and the bobbin has a convex part and a recessed part. The recessed part is recessed in the first direction. The recessed part is located further in the first direction than the convex part. The recessed part is located closer to the tip end of the spring piece than the convex part along the attachment direction. The contact part of the spring piece is configured to contact and energize the convex part at a contact position. The entering part of the spring piece is configured to enter into the recessed part. The spring piece is bent to generate an energizing force. The cover member is configured to energize the bobbin upward at the contact position by the energizing force.

According to the present application, a desired positional relationship between a cover member and a bobbin part can be easily realized.

BRIEF DESCRIPTION OF THE DRAWINGS

FIG. 10 shows a state in which a cover member elastically energizes (urges) a bobbin part. At the same time, the bobbin part elastically energizes (urges) the cover member.

DESCRIPTION OF EXEMPLARY EMBODIMENTS

Figure 1:
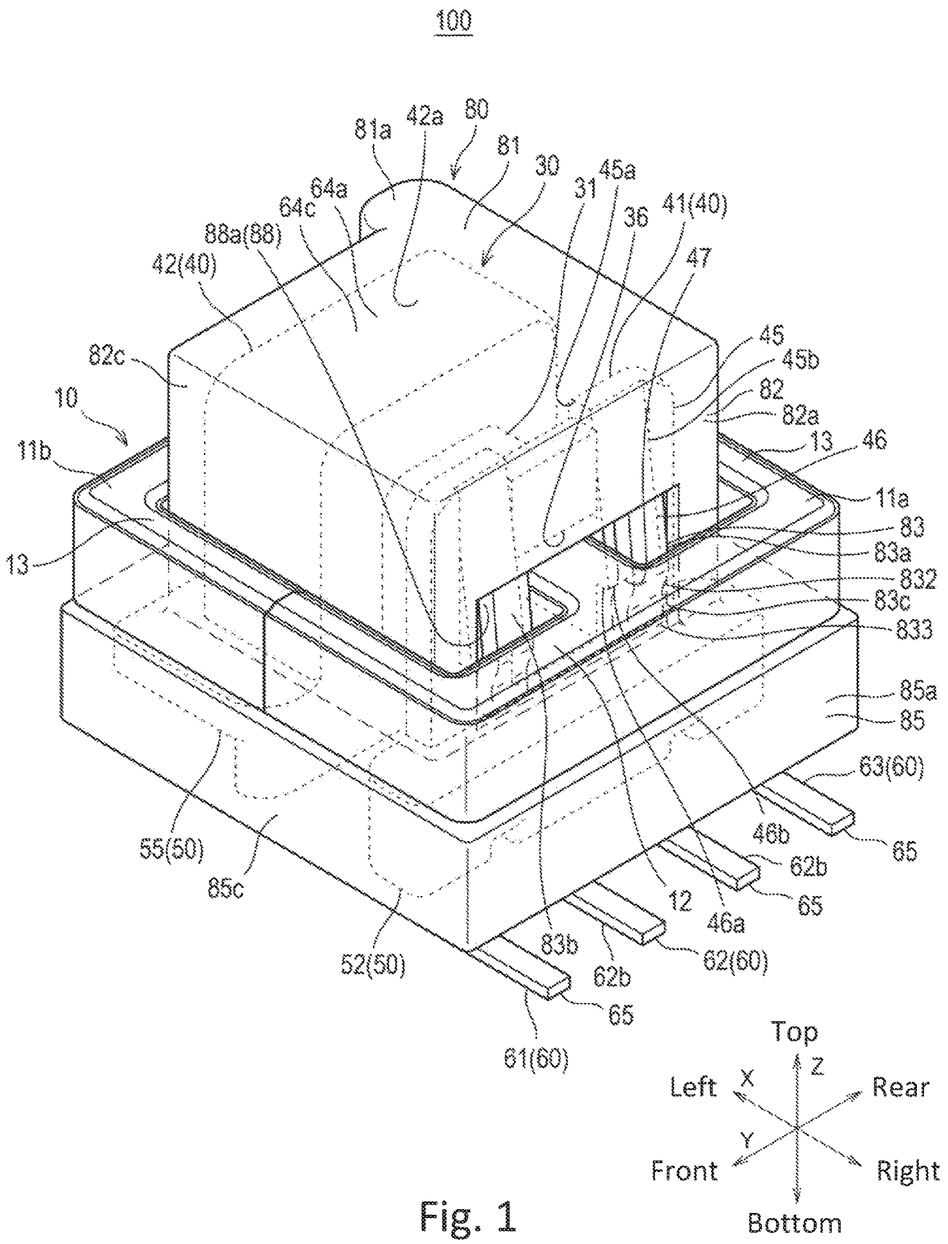
FIG. 1 is a perspective view that shows a coil component according to embodiments of the present application.
Figure 7:
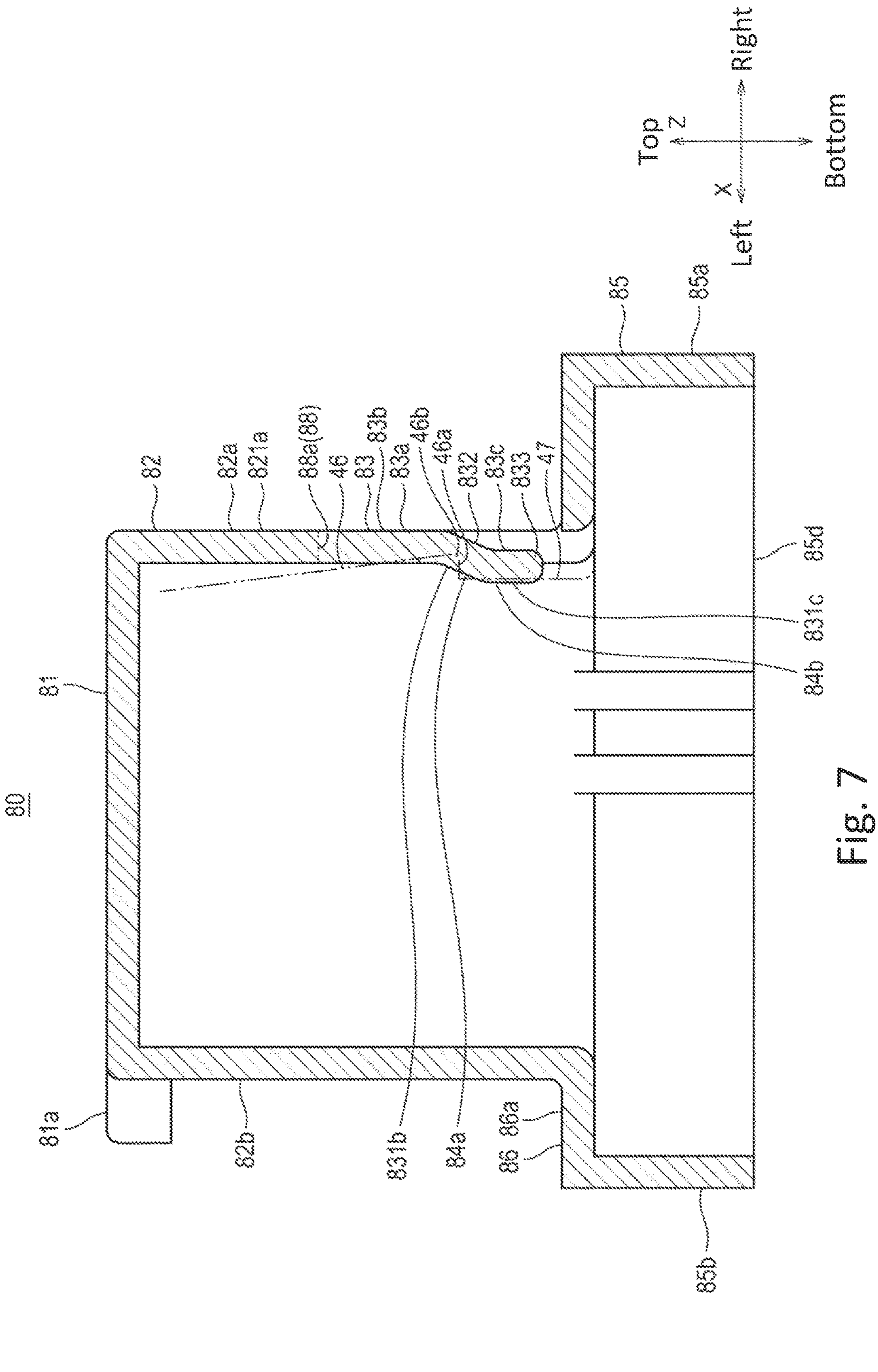
FIG. 7 is a cross-sectional view along the line A-A shown in FIG. 4 that shows a cover member of the coil component according to the embodiments of the present application.
Figure 8:
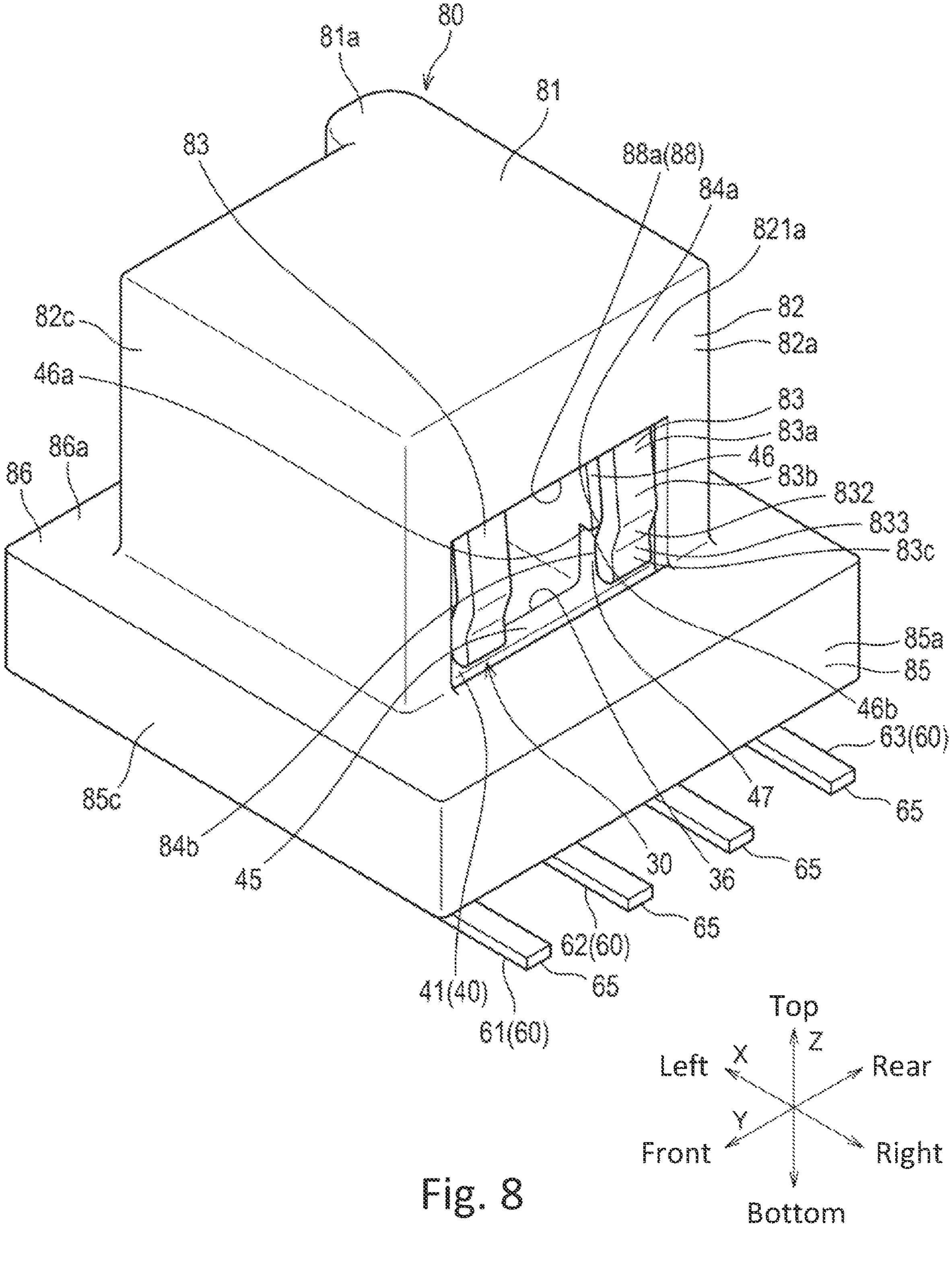
FIG. 8 is a perspective view that shows the cover member and a bobbin part of the coil component according to the embodiments of the present application.

As discussed below, embodiments according to the present application are explained with reference to FIGS. 1-9C. Further, with respect to FIGS. 1 and 3, illustrations of a first fixing tape 90 and a second fixing tape 95 are respectively omitted. FIG. 8 shows a state in which a cover member 80 and a bobbin part 30 are mutually assembled.

In regards to the embodiments, redundant explanations with respect to the same configurations are omitted but the same reference numerals are used for labeling in the drawings.

As shown in any one of FIGS. 1-9C, a coil component 100 according to the embodiments of the present application has the bobbin part 30, a magnetic core 10, a coil 70, and the cover member 80.

Specifically, the magnetic core 10 is inserted into the bobbin part 30. The coil 70 is wound around the bobbin part 30. Further, the cover member 80 covers the bobbin part 30 by being attached onto an outer periphery of the bobbin part 30.

Figure 6:
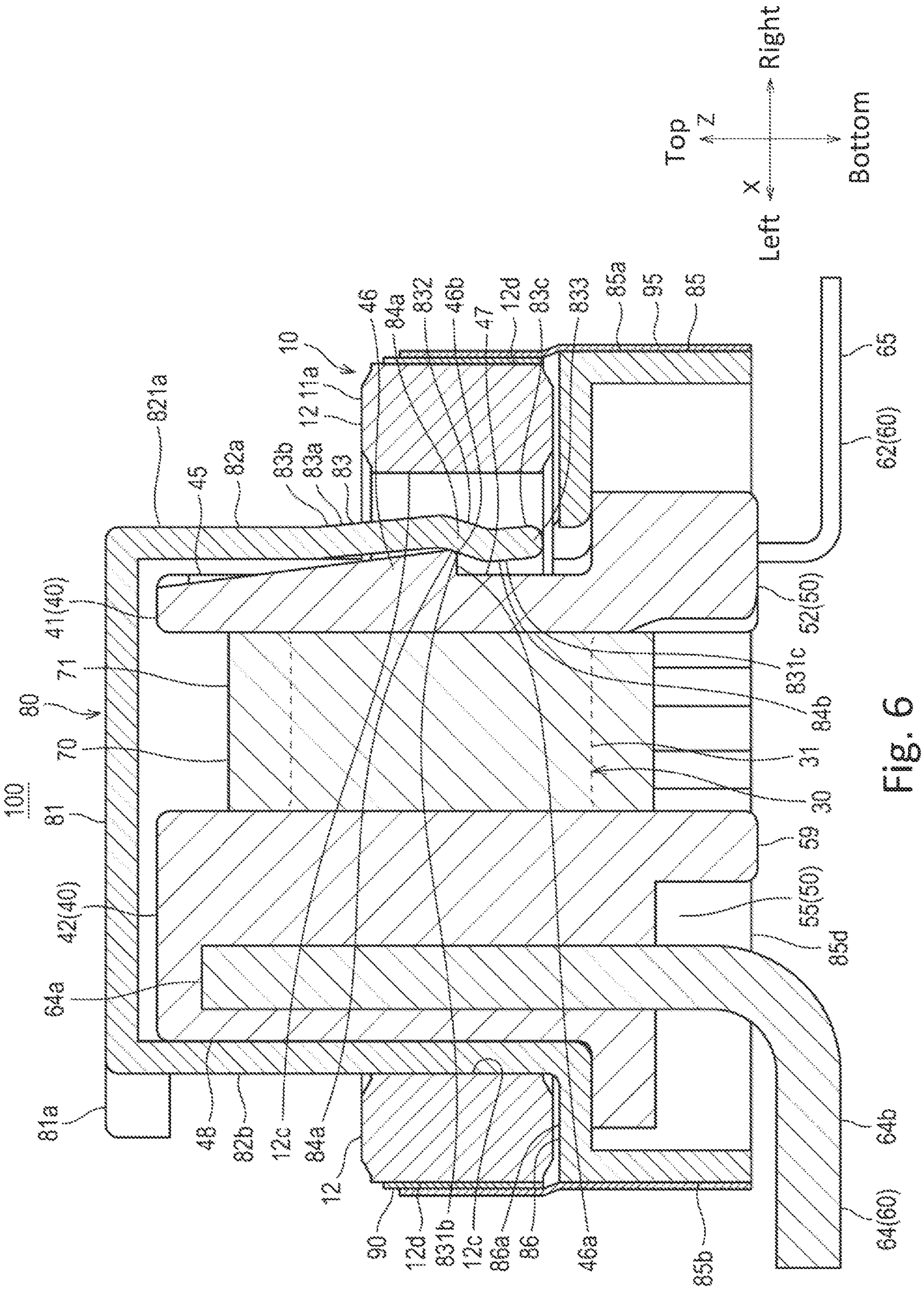
FIG. 6 is a cross-sectional view along the line A-A shown in FIG. 4 that shows the coil component according to the embodiments of the present application.

As shown in FIGS. 3 and 6, at least one of the cover member 80 and the bobbin part 30 has a spring piece 83 that elastically energizes (urges) the other of the cover member 80 and the bobbin part 30. The spring piece 83 has a cantilever structure. Specifically, in the cantilever structure, one end part 83*a* of the spring piece 83 in a direction of the attachment of the cover member 80 relative to the bobbin part 30 is supported. Further, at the same time, the spring piece 83 extends from the one end part 83*a* toward a tip part 83*c* of the spring piece 83.

Because of an energizing (urging) force of the spring piece 83, at least one of the cover member 80 and the bobbin part 30 elastically energizes the other (the other of the cover member 80 and the bobbin part 30) in a first direction that is parallel to a mounting surface. At least the other of the cover member 80 and the bobbin part 30 has a convex (protruding) part 46 and a recessed (concave) part 47 that is recessed toward a side of the first direction than the convex part 46.

The recessed part 47 is located adjacent to a side of an extending direction of the spring piece 83 relative to the convex part 46. The tip part 83*c* of the spring piece 83 has a contact part 84*a* and an entering part 84*b*. Specifically, the contact part 84*a* energizes the convex part 46 by coming into contact with the convex part 46. The entering part 84*b* is located nearer to a tip side than the contact part 84*a* and enters the recessed part 47.

The spring piece 83 is bent so that the entering part 84*b* is located nearer to the side of the first direction than the contact part 84*a*. Further, at the same time, the force, in which the cover member 80 energizes the bobbin part 30 upward at a contact portion between the contact part 84*a* and the convex part 46, is generated.

With respect to the embodiment, as an example, in FIG. 6, the left direction is defined to be the first direction and the opposite direction (the right direction) of the first direction is defined to be a second direction.

However, according to the present application, the first and second directions are not limited to the examples explained above and can be respectively appropriately set according to such as a structure or a configuration of each member that configures the coil component 100 and a positional relationship between the members to be realized.

Further, energizing in the first direction means that an energizing component of the first direction among three orthogonal directions is the greatest. With respect to these three orthogonal directions, when the energizing force is decomposed (divided) into three vectors in three directions, three orthogonal directions correspond to the first direction, a direction that is parallel to the mounting surface and is orthogonal to the first direction, and a direction that is orthogonal to the mounting surface.

Further, the convex part 46 corresponds to the part that relatively projects in the second (right) direction than the recessed part 47. In other words, the recessed part 47 corresponds to the part that is relatively recessed in the first (left) direction than the convex part 46.

According to the embodiment of the present application, at least one of the cover member 80 and the bobbin part 30 elastically energizes the other of the cover member 80 and the bobbin part 30 in the first direction. Therefore, even when there is a production variation (irregularity or tolerance) in the dimension of either one or both of the cover member 80 and the bobbin part 30 in the first direction or the second direction (the left direction or the right direction), the cover member 80 and the bobbin part 30 can be mutually positioned in the first and second directions. Therefore, a relative positional displacement (position gap or shift) between the cover member 80 and the bobbin part 30 in the first and second directions can be suppressed. In addition, because at least one of the cover member 80 and the bobbin part 30 is elastically deformed according to the production variation explained above, the production variation can be absorbed.

Further, according to the embodiment of the present application, the spring piece 83 is bent so that the entering part 84*b* is located nearer to the side of the first direction than the contact part 84*a*. Further, at the same time, the force, in which the cover member 80 energizes the bobbin part 30 upward at a contact portion between the contact part 84*a* and the convex part 46, is generated. As a result, a displacement of the cover member 80 relative to the bobbin part 30 is restricted (regulated or controlled). In other words, it can be restricted that the bobbin part 30 is displaced downward relative to the bobbin part 30. Therefore, it can be restricted that the bobbin part 30 is detached from the cover member 80. In addition, in a vertical direction, a ricketiness (rattle or looseness) of the cover member 80 relative to the bobbin part 30 can be suppressed.

As explained above, according to the embodiment of the present application, the desired positional relationship between the cover member 80 and the bobbin part 30 can be easily realized.

Further, according to the embodiment of the present application, because the cover member 80 is attached onto the outer periphery of the bobbin part 30, without using dedicated jigs, the cover member 80 and the bobbin part 30 can be mutually positioned in the first and second directions. Further, at the same time, the detachment of the bobbin part 30 from the cover member 80 can be restricted. Therefore, manufacturing easiness of the coil component 100 can be improved.

Further, according to the embodiment of the present application, the spring piece 83 has a cantilever structure in which the one end part 83*a* of the spring piece 83 in the direction of the attachment of the cover member 80 relative to the bobbin part 30 is supported. As a result, the spring piece 83 can be elastically deformed with the sufficient displacement amount. Therefore, even when the production variation in the dimension of either one or both of the cover member 80 and the bobbin part 30 in the first and second directions is generated, the production variation can be absorbed more excellently due to the elastic deformation of the spring piece 83 according to the production variation. As a result, the cover member 80 can suitably energize the bobbin part 30 regardless of the production variation.

In addition, according to the embodiment of the present application, because the spring piece 83, the convex part 46, and the recessed part 47 are provided, a relative positional displacement (position gap or shift) between the cover member 80 and the bobbin part 30 can be restricted not only in the left and right direction (the first and second directions), but also in the vertical direction (up and down direction). Therefore, it is not necessary that a relative positional displacement (position gap or shift) restriction structure is separately provided to restrict the relative positional displacement (position gap or shift) in the vertical direction. Thus, the degree of freedom in designing of the coil component 100 can be ensured and improved.

In the following explanations, the vertical direction is referred to as a "Z direction." A lower (downward or down) is the side at which terminals (terminal parts) 60 (such as in FIG. 1) explained below are arranged, i.e., the side of the mounting surface on which the coil component 100 is mounted. However, the positional relationship (in particular, a vertical positional relationship) of each part in manufacturing or using the coil component 100 is not limited to the positional relationship being explained in the embodiments of the present application.

An axial direction of the coil 70 extends in a direction orthogonal to the Z direction. The axial direction of the coil 70 is referred to as an "X direction." One side in an X direction (X axis) is referred to as a "right (right side or right direction)" and the other side is referred to as a "left (left side or left direction)."

Further, a direction orthogonal to both of the X direction and a Z direction (Z axis) is referred to as a "Y direction (Y axis)." One side in the Y direction is referred to as a "front (front side or forward)" and the other side is referred to as a "rear (rear side of backward)."

The directions explained above are shown in each of the drawings.

Further, with respect to the X direction, the side at which a center position of the coil 70 exists in the axial direction of the coil 70 is referred to as an "inner side (inside)" and the opposite side to the inside is referred to as an "outer side (outside)." Similarly, with respect to the Y direction, the side at which the center position of the coil 70 exists in the front and rear direction of the coil 70 is referred to as an "inner side (inside)" and the opposite side to the inside is referred to as an "outer side (outside)."

Further, a direction or a facing orthogonal to the Z direction is referred to as a "horizontality (horizontal or a horizontal direction)" and a direction or a facing along the Z direction is referred to as a "verticality (vertical or a vertical direction)."

Figure 2:
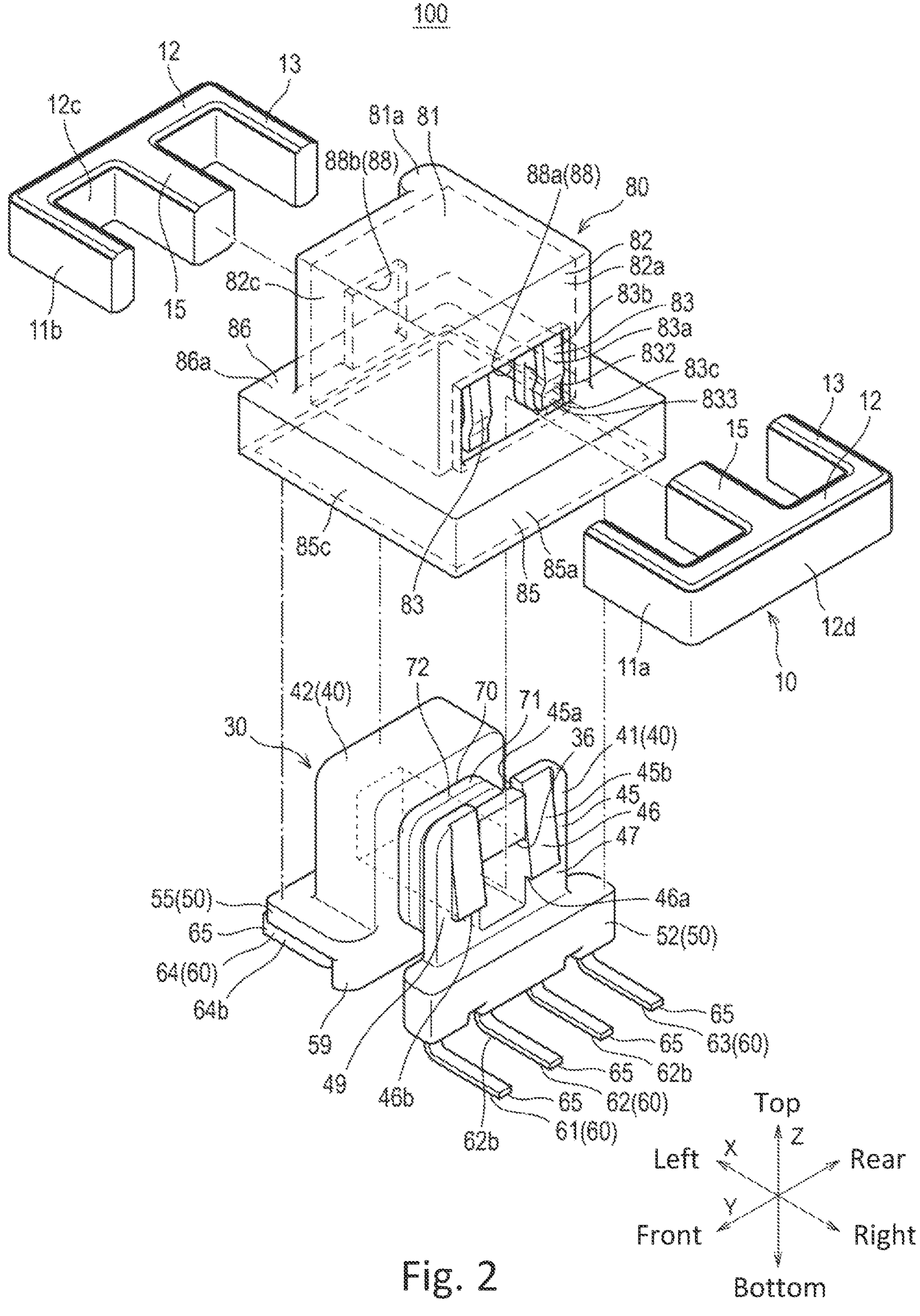
FIG. 2 is an exploded perspective view that shows the coil component according to the embodiments of the present application.
Figure 3:
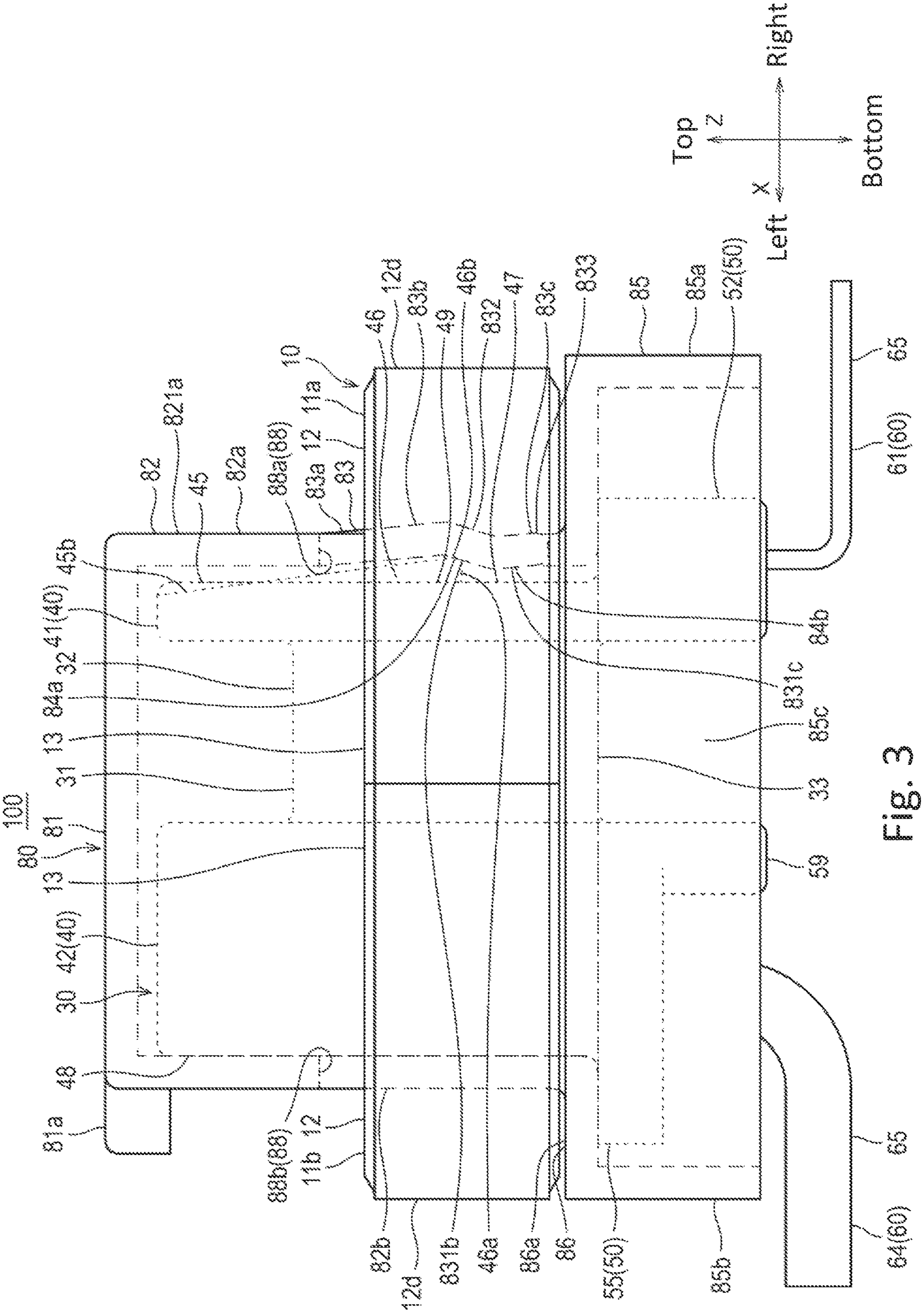
FIG. 3 is a front view that shows the coil component according to the embodiments of the present application.

As shown in FIG. 2, in the present embodiment, the magnetic core 10, for instance, has a pair of left and right core members, i.e., a first core member 11*a* that is arranged on the right side and a second core member 11*b* that is arranged on the left side.

Figure 4:
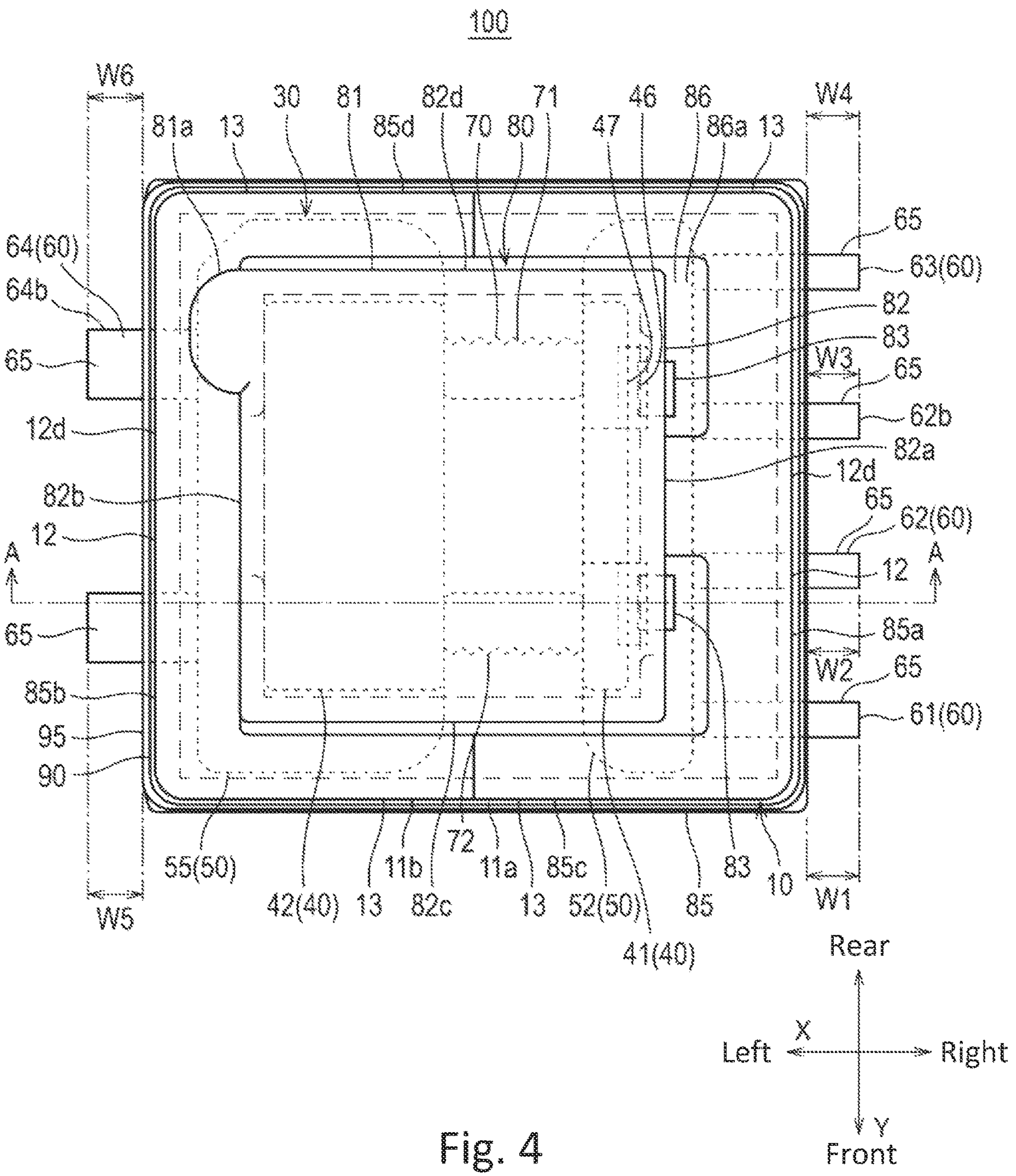
FIG. 4 is a top view that shows the coil component according to the embodiments of the present application.

Each of the first core member 11*a* and the second core member 11*b* is, for instance, referred to as an E-type core (E core or E-shaped core) in which the planar shape is formed to be E-shaped (refer to FIG. 4).

More specifically, the first core member 11*a* has a base 12, a pair of outer leg parts (outer legs) 13, and a core (center) part 15. The base 12 extends in a front and rear direction. The pair of outer leg parts 13 respectively projects (extends) from both ends of the base 12 toward the left side. The core part 15 projects (extends) from an intermediate portion of the base 12 toward the left side. Further, each of the projecting (extending) directions of the outer leg parts 13 and the core part 15 from the base 12 is the same as an axial direction of the coil 70.

The base 12 is, for instance, formed to be in a long-length shape in the front and rear direction. Further, the base 12 is formed to be in a prismatic shape (rectangular columnar-shape) having a rectangular cross section orthogonal to an axial direction of the base 12. The base 12 has four surfaces arranged around the axial direction. The two surfaces out of the four surfaces are respectively the horizontal upper and lower surfaces. One surface of the remaining two surfaces (referred to as "an inner side surface 12*c*" below) is directed to (faces) the side of the bobbin part 30. Further, the other surface of the remaining two surfaces (referred to as "an outer side surface 12*d*" below) is directed to (faces) the opposite side of the bobbin part 30. According to the embodiment of the present application, the inner side surface 12*c* of the base 12 configures an inner side surface of the first core member 11*a* and the outer side surface 12*c* of the base 12 configures an outer side surface of the first core member 11*a*.

Each of the outer leg parts 13 and the core part 15 is, for instance, formed to be in a long-length shape in the right and left direction. Further, each of the outer leg parts 13 and the core part 15 is in a prismatic shape (rectangular columnar-shape) having a rectangular cross section orthogonal to an axial direction of each of the outer leg parts 13 and the core part 15. More specifically, for instance, each of the outer leg parts 13 and the core part 15 has four surfaces arranged around the axial direction. The two surfaces out of the four surfaces are respectively the horizontal upper and lower surfaces. One surface of the remaining two surfaces is directed to (faces) the front side. Further, the other surface of the remaining two surfaces is directed to (faces) the rear side.

The vertical dimensions of the base 12, each of the outer leg parts 13, and the core part 15 are, for instance, mutually set to be the same. With respect to the first core member 11*a*, the upper surface of the base 12, the upper surfaces of the outer leg parts 13, and the upper surface of the core part 15 are mutually arranged on the same plane (coplanar). That is, an entire upper surface of the first core member 11*a* is formed to be flat, and at the same time, is horizontally arranged. Similarly, with respect to the first core member 11*a*, the lower surface of the base 12, the lower surfaces of the outer leg parts 13, and the lower surface of the core part 15 are mutually arranged on the same plane (coplanar). That is, an entire lower surface of the first core member 11*a* is formed to be flat, and at the same time, is horizontally arranged.

The second core member 11*b* is, for instance, formed to be the same shape or configuration as the first core member 11*a*. That is, the second core member 11*b* is configured with the base 12, the pair of outer leg parts (outer legs) 13, and the core (center) part 15. The base 12 has the upper surface, the lower surface, the inner side surface 12*c*, and the outer side surface 12*d*. The first core member 11*a* and the second core member 11*b* are symmetrically arranged along the right and left direction.

A distal end (tip end) surface of each of the outer leg parts 13 in the projecting (extending) direction of each of the first core member 11*a* and the second core member 11*b* is formed to be flat and is a vertical surface orthogonal to the axial direction of the coil 70.

Similarly, a distal end (tip end) surface of each of the core parts 15 in the projecting direction of each of the first core member 11*a* and the second core members 11*b* is formed to be flat and is a vertical surface orthogonal to the axial direction of the coil 70.

As shown in FIG. 4, both of the inner side surface 12*c* and the outer side surface 12*d* of the base 12 are formed to be flat and are the vertical surfaces orthogonal to the axial direction of the coil 70. The inner surface of the first core member 11*a* and the inner surface of the second core member 11*b* are opposed to (face) each other. Further, the outer surface of the first core member 11*a* and the outer surface of the second core member 11*b* are respectively directed in the opposite directions (are outwardly opposite to each other).

For instance, the bobbin part 30 has a tubular (cylindrical) part 31 and a pair of flange parts 40 that are respectively provided at both ends of the tubular part 31 in an axial direction of the tubular part 31.

The tubular part 31 is formed to be in a rectangular (hollow) tube shape (rectangular hollow cylindrical shape) having a through hole 36 that penetrates (extends) in the axial direction of the tubular part 31. The axial direction of the tubular part 31 (an axial direction of the through hole 36) is the right and left direction and corresponds to the axial direction of the coil 70.

Figure 9A:
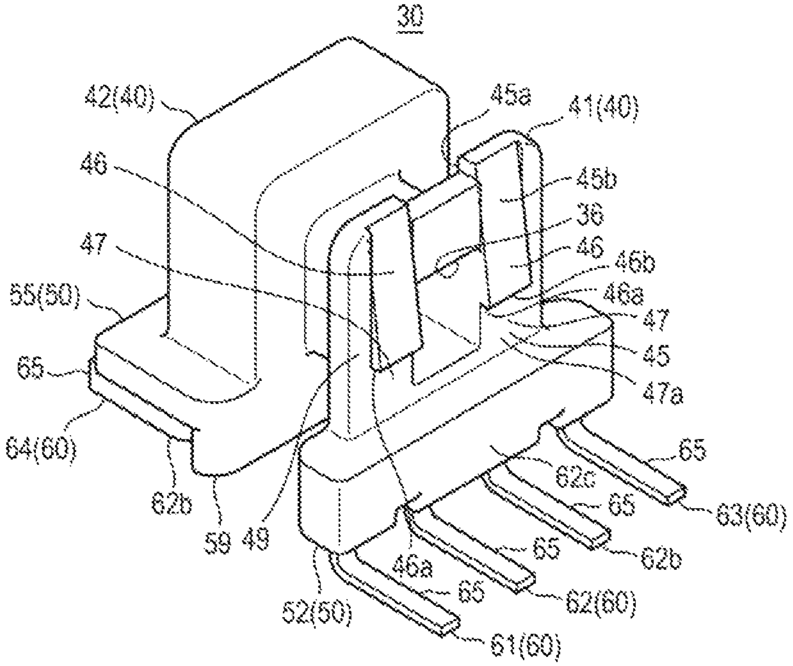
FIG. 9A is a perspective view that shows a body member according to the embodiments of the present application.
Figure 9B:
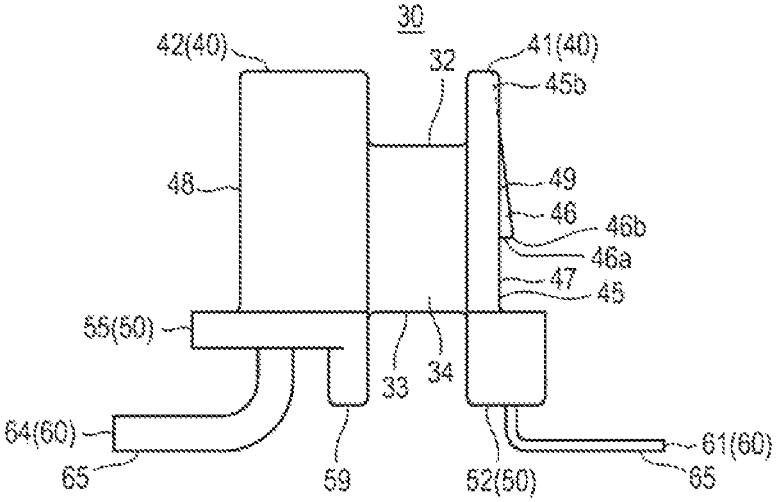
FIG. 9B is a front view that shows the body member according to the embodiments of the present application. Further.
Figure 9C:
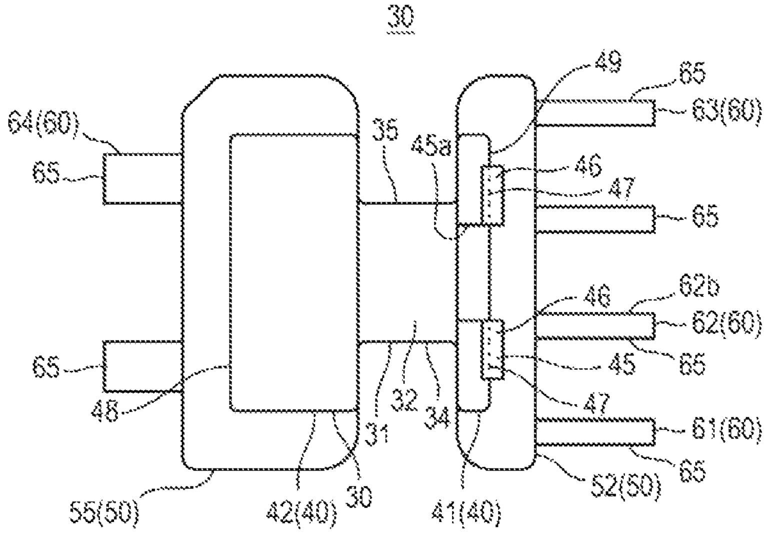
FIG. 9C is a top view that shows the body member according to the embodiments of the present application.

For instance, as shown in FIGS. 9B and 9C, the tubular part 31 is configured with an upper wall part 32, a lower wall part 33, a front wall part 34, and a rear wall part 35. Specifically, the upper wall part 32 and the lower wall part 33 are respectively horizontally arranged. Further, the front wall part 34 and the rear wall part 35 are respectively vertically arranged.

For instance, an interior space of the through hole 36 is formed to be in a rectangular tube (column) shape (rectangular cylindrical shape). A bottom surface (an inner circumference bottom surface) and a top surface of an inner circumference surface of the through hole 36 are the horizontal surfaces. The front and rear surfaces of the inner circumference surface of the through hole 36 are the vertical surfaces.

As shown in FIGS. 9A, 9B, and 9C, the bobbin part 30 has, for instance, a pair of flange parts 40, i.e., a first flange part 41 that is arranged on the right side and a second flange part 42 that is arranged on the left side.

Each of the first flange part 41 and the second flange part 42, for instance, overhangs (protrudes or extends) from both ends of the tubular part 31 toward an exterior area of the tubular part 31.

More specifically, the first flange part 41 is, for instance, formed to be in a flat plate shape orthogonal to the axial direction of the tubular part 31. The second flange part 42 is, for instance, formed to be in a flat rectangular parallelepiped shape in which the dimension in the right and left direction is smaller than each of the dimension in the top and bottom direction (vertical direction) and the dimension in the front and rear direction. Further, each of the surfaces on the right and left sides is orthogonal to the first direction.

The dimension in the right and left direction (a thickness dimension) of the first flange part 41 is smaller than the dimension in the right and left direction (a thickness dimension) of the second flange part 42. The dimension in the front and rear direction of the first flange part 41 is the same as the dimension in the front and rear direction of the second flange part 42. The vertical (top and bottom) dimension of the first flange part 41 is the same as the vertical (top and bottom) dimension of the second flange part 42.

Further, a front end surface of the first flange part 41 and a front surface of the second flange part 42 are mutually arranged on the same plane. A rear end surface of the first flange part 41 and a rear surface of the second flange part 42 are mutually arranged on the same plane.

Further, as shown in FIG. 2, the bobbin part 30 has terminal holding parts 50 and a plurality of terminals 60 that are held by the terminal holding parts 50. A winding wire 71 that configures the coil 70 is wound around the bobbin part 30.

More specifically, as shown in FIGS. 9A, 9B, and 9C, the bobbin part 30 has a first terminal holding part 52 being arranged on the right side and a second terminal holding part 55 being arranged on the left side as the terminal holding parts 50.

The first terminal holding part 52 is, for instance, formed to be in the long-length shape in the front and rear direction and is formed to be in a flat rectangular tube (column) shape (flat rectangular cylindrical shape) in which the dimension in the right and left direction is smaller than the dimension in the vertical (top and bottom) direction.

The second terminal holding part 55 is, for instance, formed to be in the long-length shape in the front and rear direction and is formed to be in the flat plate shape in which the dimension in the vertical (top and bottom) direction is smaller than the dimension in the right and left direction.

In addition, at a lower (bottom) surface of the second terminal holding part 55, for instance, an overhung (protruding) part 59 is formed (refer to FIGS. 1 and 3). The overhung part 59 is hung down from a right side edge of the second terminal holding part 55. The overhung part 59 is formed to be in a flat plate shape in which plate surfaces are directed to (face toward) the right and left direction. A right side surface of the overhung part 59 and the right side surface of the second terminal holding part 55 are arranged on the same plane (coplanar).

The first terminal holding part 52 overhangs (extends) from a lower edge of the first flange part 41 toward the right direction and the front and rear direction. The second terminal holding part 55 overhangs (extends) from a lower edge of the second flange part 42 toward the left direction and the front and rear direction.

In the present embodiment, the dimension in the right and left direction of the first terminal holding part 52 is smaller than the dimension in the right and left direction of the second terminal holding part 55. The dimension in the vertical direction of the first terminal holding part 52 is larger than the dimension in the vertical direction of the second terminal holding part 55 (however, except for the overhung part 59). The dimension in the front and rear direction of the first terminal holding part 52 is the same as the dimension in the front and rear direction of the second terminal holding part 55. Further, the height position of a lower end surface of the overhung part 59 is the same as the height position of a lower end surface of the first terminal holding part 52.

However, a dimensional relationship between the first terminal holding part 52 and the second terminal holding part 55 is not particularly limited. The dimensions of the first terminal holding part 52 and the second terminal holding part 55 may be the same each other.

The upper surfaces of the first terminal holding part 52 and the second terminal holding part 55 are formed to be flat and are horizontally arranged.

The first terminal holding part 52 holds, for instance, a first terminal (first terminal part) 61, a second terminal (second terminal part) 62, and a third terminal (third terminal part) 63 that are explained below. The second terminal holding part 55 holds, for instance, a fourth terminal (fourth terminal part) 64 that is explained below.

Figure 5:
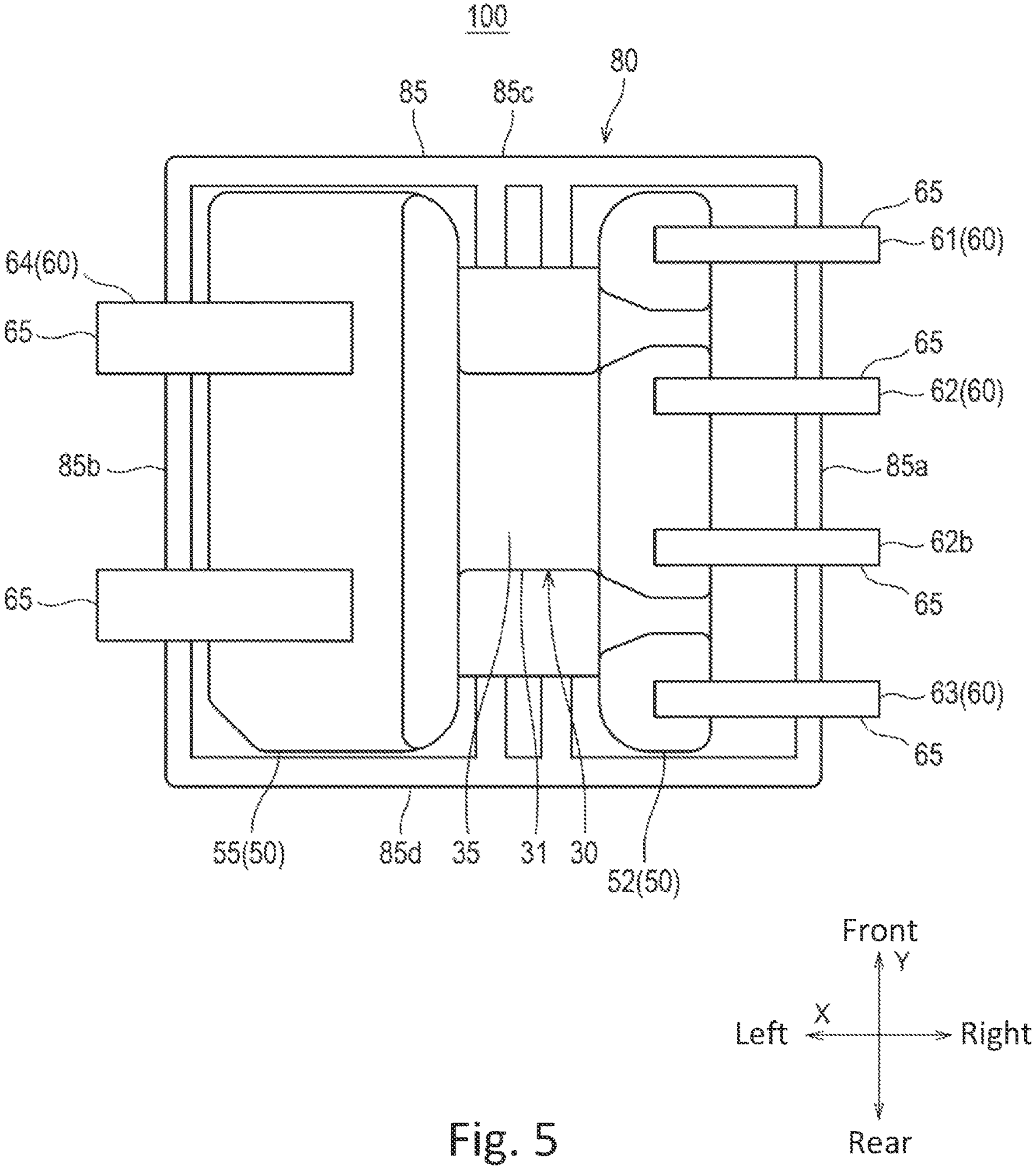
FIG. 5 is a bottom view that shows the coil component according to the embodiments of the present application.

As shown in FIGS. 4 and 5, in the present embodiment, the coil component 100 has, for instance, the first terminal 61, the second terminal 62, the third terminal 63, and the fourth terminal 64 as the terminals (terminal parts) 60.

The first terminal 61, the second terminal 62, and the third terminal 63 are arranged alongside in this order from the front side to the rear side in the front and rear direction at the first terminal holding part 52. The fourth terminal 64 is arranged at the second terminal holding part 55.

The first terminal 61 is, for instance, configured with a (plate-shaped) metal member that is formed by bending a long-length metal member that is in a plate shape.

As shown in FIGS. 2 and 3, the first terminal 61 has a lower end part that is exposed from the first terminal holding part 52, and an upper end part and a middle part (not shown) that are embedded in the first terminal holding part 52. The lower end part of the first terminal 61 is an external terminal (external terminal part) 65. The external terminal 65 is connected to an external device/element during mounting of the coil component 100.

More specifically, the first terminal 61 is folded back in an inside of the first terminal holding part 52. In the front view, a configuration (shape) of the first terminal 61 is a shape that is formed by laterally rotating a U-shaped terminal by 90 degrees (a toppled U-shaped terminal).

The external terminal 65 of the first terminal 61 projects downward from the bottom surface of the first terminal holding part 52, and in addition, extends toward the right direction. That is, an extending direction of a tip part of the external terminal 65 of the first terminal 61 corresponds to the second direction.

For instance, the third terminal 63 is formed to be in the same shape as the first terminal 61. Therefore, the third terminal 63 has an external terminal 65 that is exposed to the outside from the first terminal holding part 52, and an upper end part and a middle part (not shown) that are embedded in the first terminal holding part 52.

The second terminal 62 is, for instance, configured with a (plate-shaped) metal member that is formed by bending a long-length metal member that is in a plate shape and that is downwardly branched into two parts.

As shown in FIGS. 2 and 6, the second terminal 62 has a pair of front and rear legs (leg parts) 62*b*, an extension part 62*c*, and a connection part (not shown). Specifically, the pair of front and rear legs 62*b* are respectively exposed to the outside from the bottom surface of the first terminal holding part 52. The connection part is embedded in the first terminal holding part 52 and connects the pair of legs 62*b* and the extension part 62*c*.

The pair of legs 62*b* are the external terminals 65 that are respectively connected to an external device/element during mounting of the coil component 100.

The second terminal 62 is folded back in an inside of the first terminal holding part 52. In the front view and the plan view, a configuration (shape) of the second terminal 62 is a shape in which a U-shaped terminal is flipped upside down and is opened downward.

Each of the external terminals 65 of the second terminal 62 projects downward from the bottom surface of the first terminal holding part 52, and in addition, extends toward the right direction. That is, the extending directions of the tips of external terminals 65 of the second terminal 62 correspond to the second direction.

The length (linear) dimension in the right and left direction of each of the external terminals 65 of the first terminal 61, the second terminal 62, and the third terminal 63 is, for instance, set to be mutually the same.

Further, the thickness dimensions of the metal members being in the plate shapes that configure the first terminal 61, the second terminal 62, and the third terminal 63 are set to be mutually the same.

The fourth terminal 64 is, for instance, configured with a (plate-shaped) metal member that is formed by bending a long-length metal member that is in a plate shape and that is downwardly branched into two parts.

As shown in FIGS. 3 and 6, the fourth terminal 64 has a pair of front and rear legs (leg parts) 64*b* and a connection part 64*a*. Specifically, the pair of front and rear legs 64*b* are respectively exposed to the outside from the bottom surface of the second terminal holding part 55. The connection part 64*a* is embedded in the second terminal holding part 55 and the second flange part 42 and connects between the pair of legs 62*b* to each other.

The pair of legs 64*b* are the external terminals 65 that are respectively connected to an external device/element during mounting of the coil component 100.

The fourth terminal 64 is folded back in an inside of the second terminal holding part 55 and the second flange part 42. In the side view and the plan view, a configuration (shape) of the fourth terminal 64 is a shape in which a U-shaped terminal is flipped upside down and is opened downward.

As shown in FIGS. 9A and 9C, each of the external terminals 65 of the fourth terminal 64, for instance, projects downward from the bottom surface of the second terminal holding part 55, and, in addition, extends toward the left direction. That is, the extending directions of the tips of the external terminals 65 of the fourth terminal 64 correspond to the first direction.

The length (linear) dimension in the right and left direction of each of the external terminals 65 of the fourth terminal 64 is, for instance, set to be mutually the same.

Further, the thickness dimension of the metal member being in the plate shape that configures the fourth terminal 64 is, for instance, larger than the thickness dimensions of the metal members being in the plate shapes that configure the first terminal 61, the second terminal 62, and the third terminal 63.

As shown in FIGS. 2 and 4, the coil component 100 has, for instance, a first coil and a second coil as the coil(s) 70.

Each of the first and second coils is configured by the winding wire 71. Each of the winding wires 71 of the coil(s) 70 is wound around the tubular part 31 of the bobbin part 30. A winding section (wound section) 72 (refer to FIG. 2) is configured with the winding wires 71 wound around the tubular part 31. Both ends of each of the winding wires 71 are respectively electrically connected to the corresponding terminals 60. As an example, the both ends of each of the winding wires 71 are electrically connected to these corresponding terminals 60 by being respectively pulled out from the winding section 72 and being entwined to the corresponding terminals 60. Further, illustrations of the portion of the winding wires 71 that are pulled out from the winding section 72 and the entwining parts of the winding wires 71 to the terminals 60 are omitted from the drawings. The portion to which each of the winding wires 71 is entwined may be the part that projects from the terminal holding part 50 of the terminal 60 (for instance, the part that projects from the terminal holding part 50 separately from the part of the L-shape terminal including the external terminal 65 or the part between the part being embedded in the bobbin part 30 and the external terminal 65 of the terminal 60) and may be the part being embedded in the bobbin part 30 of the terminal 60.

Further, the illustrations of the ends of the winding wires 71 that are entwined to the terminals 60 and the portions that extend from the winding section 72 toward the terminals 60 are omitted in each drawing.

As shown in FIGS. 2, 4, 6, and 8, the cover member 80 has a side circumferential (peripheral) wall part 82 that includes a first wall part 82*a* and a second wall part 82*b* opposed to each other (outwardly opposite to each other). More specifically, the cover member 80 has, for instance, the side circumferential wall part 82 (a first circumferential side wall part 82) that is in a square (rectangular) tubular shape and that includes the first wall part 82*a*, the second wall part 82*b*, a third wall part 82*c*, and a fourth wall part 82*d*.

Further, the cover member 80 has a top surface (refer to such as FIG. 2) that occludes (seals or covers) an upper edge of the side circumferential wall part 82. In addition, as shown in FIGS. 2, 6, and 7, the cover member 80 is, for instance, opened downward.

The first wall part 82*a*, the second wall part 82*b*, the third wall part 82*c*, and the fourth wall part 82*d* are respectively formed to be in a flat plate shape and vertically arranged.

As shown in FIGS. 4 and 6, for instance, the first wall part 82*a* and the second wall part 82*b* are mutually opposed to (face) each other in the right and left direction (the first and second directions). The third wall part 82*c* and the fourth wall part 82*d* are mutually opposed to (face) each other in the front and rear direction. More specifically, the plate surfaces (wall surfaces) of the first wall part 82*a* and the second wall part 82*b* are, for instance, directed to (face toward) the opposite directions along the right and left direction. The plate surfaces (wall surfaces) of the third wall part 82*c* and the fourth wall part 82*d* are, for instance, directed to (face toward) the opposite directions along the front and rear direction.

The top surface 81 is, for instance, formed to be in a flat plate shape and horizontally arranged. Since the cover member 80 has the top surface 81, the top surface 81 can be sucked by a (suction) mounter when the coil component 100 is mounted on a substrate (an external device/element). As a result, the work in which the coil component 100 is mounted on the substrate can be easily performed.

However, it is not required that the top surface 81 is formed to be flat. Further, the cover member 80 may be in a shape without the top surface 81 (for instance, the shape being opened upward and downward (hollow shape being opened at both ends)).

The cover member 80 has, for instance, a projection part 81*a* (refer to FIGS. 1 and 3) that projects from the rear upper part of the left side surface of the cover member 80 adjacent to the top surface 81 toward the left direction. Because the projection part 81*a* is provided, the direction or orientation of the cover member 80 can be easily discriminated and determined.

As explained above, the cover member 80 is, for instance, arranged so as to cover the bobbin part 30. More specifically, as shown in FIG. 4, for instance, the first wall part 82*a* covers the right side part of the bobbin part 30, the second wall part 82*b* covers the left side part of the bobbin part 30, the third wall part 82*c* covers the front side part of the bobbin part 30, and the fourth wall part 82*d* covers the rear side part of the bobbin part 30. Further, as shown in FIG. 3, the top surface 81 covers the upper side part of the bobbin part 30.

As explained above, because the cover member 80 covers the bobbin part 30, a sufficient pressure resistance of the coil component 100 can be ensured.

Further, as shown in FIGS. 2 and 3, in the first wall part 82*a*, for instance, a through hole (through opening) 88*a* is formed. The through hole 88*a* penetrates (extends) through the first wall part 82*a* in the right and left direction. Similarly, in the second wall part 82*b*, for instance, a through hole (through opening) 88*b* is formed. The through hole 88*b* penetrates (extends) through the second wall part 82*b* in the right and left direction. The through holes 88*a* and 88*b* are arranged at positions opposite (facing) to each other.

The through hole 88*b* of the second wall part 82*b* is, for instance, formed to be in a square (rectangular) shape that is substantially the same as the shape of the through hole 36 of the bobbin part 30 when viewed from the axial direction of the through hole 36. On the other hand, the through hole 88*a* of the first wall part 82*a* is, for instance, formed to be in a substantially square (rectangular) shape that has a long-length in the front and rear direction (refer to FIG. 8). The upper and lower edges of the through hole 88*a* are respectively horizontally arranged. Similarly, the upper and lower edges of the through hole 88*b* are respectively horizontally arranged.

Further, in the present embodiment, the cover member 80 has a flange part 86 that overhangs (protrudes or extends) outward from the lower (bottom) end of the side circumferential wall part 82. More specifically, as shown in FIG. 6, the cover member 80 has the flange part 86 and a second circumferential side wall part 85. The flange part 86 overhangs (protrudes or extends) toward an exterior area (the horizontal direction) of the cover member 80 from the lower (bottom) end of the side circumferential wall part 82. The second circumferential side wall part 85 is hung down from a periphery (outer circumference edge) of the flange part 86, and at the same time, surrounds the periphery of the terminal holding part 50.

The flange part 86 is, for instance, formed to be in a flat plate shape and is horizontally arranged. An upper surface 86*a* and a lower surface of the flange part 86 are respectively a horizontal surface being formed to be substantially flat. However, for instance, a projection part that projects downward may be formed on the lower surface of the flange part 86.

As shown in FIG. 4, the second circumferential side wall part 85 is, for instance, formed to be in a square (rectangular) shape in a plan view. An interior space of the second circumferential side wall part 85 is formed to be in a rectangular parallelepiped shape. A lower (bottom) end of the second circumferential side wall part 85 is opened downward. In the present embodiment, an opening at a side of the lower (bottom) end of the second circumferential side wall part 85 configures an opening of the cover member 80.

The second circumferential side wall part 85 has a first wall part 85*a*, a second wall part 85*b*, a third wall part 85*c*, and a fourth wall part 85*d*. Specifically, the first wall part 85*a* surrounds (faces) the right side part of the terminal holding part 50, the second wall part 85*b* surrounds (faces) the left side part of the terminal holding part 50, the third wall part 85*c* surrounds (faces) the front side part of the terminal holding part 50, and the fourth wall part 85*d* surrounds (faces) the rear side part of the terminal holding part 50 (refer to FIGS. 4 and 5).

Each of the first wall part 85*a*, the second wall part 85*b*, the third wall part 85*c*, and the fourth wall part 85*d* is, for instance, formed to be in a flat plate shape and is vertically arranged.

As shown in FIG. 4, the plate surfaces (the wall surfaces) of the first wall part 85*a* and the second wall part 85*b* are directed to (face toward) the opposite directions along the right and left direction. The plate surfaces (the wall surfaces) of the third wall part 85*c* and the fourth wall part 85*d* are directed to (face toward) the opposite directions along the front and rear direction.

Further, as shown in FIG. 6, with respect to the flange part 86, the dimension in the right and left direction of the portion that overhangs (protrudes or extends) toward the right side is larger than the dimension in the right and left direction of the portion that overhangs (protrudes or extends) toward the left side. More specifically, with respect to the flange part 86, the dimension in the right and left direction of the portion that overhangs toward the right side is set to be larger than the dimension in the right and left direction of the base 12 of the first core member 11*a*. The dimension in the right and left direction of the portion that overhangs toward the left side is set to be substantially the same as the dimension in the right and left direction of the base 12 of the first core member 11*a* or is set to be slightly larger than the dimension in the right and left direction of the base 12 of the first core member 11*a*.

As explained above, the cover member 80 is, for instance, opened downward. Further, since the cover member 80 is put over the bobbin part 30 from above and is pushed downward relative to the bobbin part 30, the cover member 80 is attached onto the outer periphery of the bobbin part 30. Therefore, in the present embodiment, a direction of the attachment of the cover member 80 relative to the bobbin part 30 (hereinafter is sometimes simply referred to as "a direction of the attachment" or "an attachment direction.") is the vertical (up and down) direction.

Further, the through holes 88*a* and 88*b* of the cover member 80 and the through hole 36 the bobbin part 30 are mutually coaxially arranged.

As shown in FIGS. 4 and 5, it is preferred that the inner surface (the surface on the left side) of the first wall part 82*a* is arranged so as to be opposed to (face) the surface on the right side of the first flange part 41 in parallel. It is preferred that the inner surface (the surface on the right side) of the second wall part 82*b* is arranged so as to be opposed to (face) the surface on the left side of the second flange part 42 in parallel. It is preferred that the inner surface of the third wall part 82*c* is arranged so as to be opposed to (face) each of the front end surfaces of the first flange part 41 and the second flange part 42 in parallel. It is preferred that the inner surface of the fourth wall part 82*d* is arranged so as to be opposed to (face) each of the rear end surfaces of the first flange part 41 and the second flange part 42 in parallel.

Further, as shown in FIG. 6, the inner surface (the lower surface) of the top surface 81 is, for instance, opposed to (faces) each of the upper end surfaces of the first flange part 41 and the second flange part 42 in a state in which they are located adjacent to or near each other. However, the inner surface of the top surface 81 may be in surface contact with the upper end surfaces of the first flange part 41 and the second flange part 42.

As shown in FIGS. 4 and 6, it is preferred that the inner surface of the first wall part 85*a* is arranged so as to be opposed to (face) the surface on the right side of the first terminal holding part 52 in parallel. It is preferred that the inner surface of the second wall part 85*b* is arranged so as to be opposed to (face) the surface on the left side of the second terminal holding part 55 in parallel. It is preferred that the inner surface of the third wall part 85*c* is arranged so as to be opposed to (face) each of the front surfaces of the first terminal holding part 52 and the second terminal holding part 55 in parallel. It is preferred that the inner surface of the fourth wall part 85*d* is arranged so as to be opposed to (face) each of the rear surfaces of the first terminal holding part 52 and the second terminal holding part 55 in parallel.

Further, it is preferred that the lower surface of the flange part 86 is in surface contact (for instance, is pressed in touch) with the bobbin part 30.

More specifically, as shown in FIG. 6, with respect to the flange part 86 of the cover member 80, it is preferred that the bottom surface of the portion that overhangs (protrudes or extends) toward the right side from the first wall part 82*a* is, for instance, pressed in touch with the upper surface of the first terminal holding part 52 of the bobbin part 30. With respect to the flange part 86, it is preferred that the bottom surface of the portion that overhangs (protrudes or extends) toward the left side from the second wall part 82*b* is, for instance, pressed in touch with the upper surface of the second terminal holding part 55 of the bobbin part 30. As a result, in the vertical direction, the ricketiness (rattle or looseness) of the cover member 80 with respect to the bobbin part 30 can be more securely suppressed.

Further, as shown in FIG. 6, it is preferred that the convex part 46 is arranged above the upper surface of the first terminal holding part 52.

The core part 15 of the first core member 11*a* is inserted into the through hole 36 of the bobbin part 30 through the through holes 88*a* of the first wall part 82*a* (the right side of the cover member 80) (refer to FIG. 1). Similarly, the core part 15 of the second core member 11*b* is inserted into the through hole 36 of the bobbin part 30 through the through hole 88*b* of the second wall part 82*b* (the left side of the cover member 80).

The distal end surface (tip surface) of the core part 15 of the first core member 11*a* and the distal end surface (tip surface) of the core part 15 of the second core member 11*b* are abutted against (contacted) each other in an inside the through hole 36 or are located adjacent to or close to each other. That is, the distal end surface of the core part 15 of the first core member 11*a* and the distal end surface of the core part 15 of the second core member 11*b* may be in surface contact with each other or may be mutually opposed to (face) each other in a state in which they are located adjacent to or close to each other.

A closed magnetic path is configured by the first core member 11*a* and the second core member 11*b*.

Further, as shown in FIG. 4, since the coil 70 is wound around the bobbin part 30 and the core parts 15 are inserted into the bobbin part 30, the coil 70 is wound around the magnetic core 10.

As shown in FIG. 4, the outer leg parts 13 of the first core member 11*a* located at the front and rear sides are arranged at an outside of the side circumferential wall part 82 and are respectively arranged along the outer surfaces of the third wall part 82*c* and the fourth wall part 82*d*. The base 12 of the first core member 11*a* is arranged at the outside of the side circumferential wall part 82 and the inner side surface 12*c* of the base 12 is arranged so as to be opposed to (face) the outer surface of the first wall part 82*a*.

Similarly, the outer leg parts 13 of the second core member 11*b* located at the front and rear sides are arranged at the outside of the side circumferential wall part 82 and are respectively arranged along the outer surfaces of the third wall part 82*c* and the fourth wall part 82*d*. The base 12 of the second core member 11*b* are arranged at the outside of the side circumferential wall part 82 and the inner side surface 12*c* of the base 12 is arranged so as to be opposed to (face) or come in surface contact with the outer surface of the second wall part 82*b*.

More specifically, as shown in FIG. 4, a space (gap) is formed between the inner side surface 12*c* of the base 12 of the first core member 11*a* and the outer surface of the first wall part 82*a*. On the other hand, a space (gap) may be formed or may not be formed between the inner side surface 12*c* of the base 12 of the second core member 11*b* and the outer surface of the second wall part 82*b*.

The distal end surface (tip surface) of the front side outer leg part 13 of the first core member 11*a* and the distal end surface (tip surface) of the front side outer leg part 13 of the second core member 11*b* are abutted against (contacted) each other or are located adjacent to or close to each other. That is, the distal end surface of the front side outer leg part 13 of the first core member 11*a* and the distal end surface of the front side outer leg part 13 of the second core member 11*b* may be in surface contact with each other or may be mutually opposed to (face) each other in a state in which they are located adjacent to or close to each other. Similarly, the distal end surface (tip surface) of the rear side outer leg part 13 of the first core member 11*a* and the distal end surface (tip surface) of the rear side outer leg part 13 of the second core member 11*b* are abutted against (contacted) each other or are located adjacent to or close to each other.

The bases 12 and the outer leg parts 13 of the first core member 11*a* and the second core member 11*b* are arranged at the upper side the flange part 86 and are arranged along the upper surface 86*a* of the flange part (refer to FIGS. 3 and 6).

The lower surfaces of the core parts 15 of the first core member 11*a* and the second core member 11*b* are arranged along an inner circumference bottom surface of the through hole 36 of the bobbin part 30.

As shown in FIG. 3, the lower (bottom) surfaces of the first core member 11*a* and the second core member 11*b* are mutually arranged on the same plane. The lower surfaces of the first core member 11*a* and the second core member 11*b* are arranged along the upper surface 86*a* of the flange part 86. The lower surfaces of the first core member 11*a* and the second core member 11*b* and the upper surface 86*a* of the flange part 86 may be in surface contact with each other or may be mutually opposed to (face) each other in a state in which they are located adjacent to or close to each other.

As shown in FIGS. 4 and 6, it is preferred that the outer side surface 12*c* of the base 12 of the first core member 11*a* is arranged further inside than the outer surface of the first wall part 85*a* of the second circumferential side wall part 85 or they are arranged on the same plane (coplanar). It is preferred that the outer side surface 12*c* of the base 12 of the second core member 11*b* is arranged further inside than the outer surface of the second wall part 85*b* of the second circumferential side wall part 85 or they are arranged on the same plane (coplanar). It is preferred that each of the outer surfaces of the front side outer leg part 13 of the first core member 11*a* and the front side outer leg part 13 of the second core member 11*b* is arranged further inside than the outer surface of the third wall part 85*c* of the second circumferential side wall part 85 or they are arranged on the same plane (coplanar). It is preferred that each of the outer surfaces of the rear side outer leg part 13 of the first core member 11*a* and the rear side outer leg part 13 of the second core member 11*b* is arranged further inside than the outer surface of the fourth wall part 85*d* of the second circumferential side wall part 85 or they are arranged on the same plane (coplanar).

As explained above, in the present embodiment, the magnetic core 10 is inserted into the bobbin part 30 through the cover member 80. Therefore, since the positional relationship between the bobbin part 30 and the cover member 80 can be excellently maintained, the positional relationship between the magnetic core 10 and the coil 70 can also be excellently maintained. As a result, furthermore stable characteristics of the coil component 100 can be realized.

In the present embodiment, the coil component 100 has a first fixing tape 90 (refer to FIGS. 4 and 6) that is wound around the magnetic core 10. Because the first fixing tape 90 is wound around the magnetic core 10, a state, in which the core parts 15 of each of the first core member 11*a* and the second core member 11*b* are inserted into the through hole 36 of the bobbin part 30, is excellently maintained.

More specifically, as shown in FIG. 4, the first fixing tape 90 is, for instance, wound along the outer side surface 12*d* of the base 12 of the second core member 11*b*, the outer surface of the front side outer leg part 13 of the second core member 11*b*, the outer surface of the front side outer leg part 13 of the first core member 11*a*, the outer side surface 12*d* of the base 12 of the first core member 11*a*, the outer surface of the rear side outer leg part 13 of the first core member 11*a*, the outer surface of the rear side outer leg part 13 of the second core member 11*b*, and again the outer side surface 12*d* of the base 12 of the second core member 11*b*.

In the present embodiment, the first fixing tape 90 is formed to be in a long band-like shape in one direction. The first fixing tape 90 may, for instance, be an adhesive tape on which an adhesive layer is formed in advance or may also be a band-like member that is adhered by using an adhesive material when the coil component 100 is assembled.

Further, in the present embodiment, the coil component 100 has a second fixing tape 95 (refer to FIGS. 4 and 6) that is wound around each of the magnetic core 10 and the cover member 80. Because the second fixing tape 95 is wound around each of the magnetic core 10 and the cover member 80, the magnetic core 10 is excellently fixed to each of the bobbin part 30 and the cover member 80.

More specifically, as shown in FIGS. 4 and 6, the second fixing tape 95 is, for instance, wound along an entirety of the circumference of the outer surface of the first fixing tape 90, the outer surface of the first wall part 85*a* of the second circumferential side wall part 85, the outer surface of the second wall part 85*b* of the second circumferential side wall part 85, the outer surface of the third wall part 85*c* of the second circumferential side wall part 85, and outer surface of the fourth wall part 85*d* of the second circumferential side wall part 85.

In the present embodiment, the second fixing tape 95 is formed to be in a long band-like shape in one direction. The second fixing tape 95 may, for instance, be an adhesive tape on which an adhesive layer is formed in advance or may also be a band-like member that is adhered by using an adhesive material when the coil component 100 is assembled. As shown in FIG. 6, a top portion of the second fixing tape 95 is wound around the first fixing tape 90.

The dimension in the vertical (up and down) direction of the first fixing tape 90 is, for instance, set to be substantially the same as the dimension in the vertical direction of the magnetic core 10. The dimension in the vertical (up and down) direction of the second fixing tape 95 is, for instance, larger than the dimension in the vertical direction of the magnetic core 10 and smaller than the dimension in the vertical direction of the cover member 80.

As shown in FIGS. 4 and 5, it is preferred that each of the external terminals 65 projects outward than an outline (a contour line) of the part, which does not include the external terminals 65, of the coil component 100 in the plan view. Further, it is more preferred that the projecting lengths (dimensions W1, W2, W3, and W4 shown in FIG. 4) of the external terminals 65 of the first terminal 61, the second terminal 62, and the third terminal 63 from the outline (contour line) are substantially the same. Similarly, it is more preferred that the projected lengths (dimensions W5 and W6 shown in FIG. 4) of the external terminals 65 of the fourth terminal 64 from the outline (contour line) are substantially the same.

In the present embodiment, as explained above, in the right and left direction that is the extending directions of the tip parts of the external terminals 65, because at least one of the cover member 80 and the bobbin part 30 elastically energizes (urges) the other of the cover member 80 and the bobbin part 30, the displacement of the cover member 80 relative to the bobbin part 30 in the right and left direction is restricted (regulated or controlled). As a result, the state in which each of the external terminals 65 substantially evenly projects outward than the outline (contour line) can be easily realized and maintained.

In addition, when the dimension in the right and left direction of each of the external terminals 65 is designed, the displacement of the cover member 80 relative to the bobbin part 30 in the right and left direction does not need to be considered. As a result, the outside dimension of the entire coil component 100 including the external terminals 65 can be designed to be smaller.

In the present embodiment, as an example, each of the dimensions W1, W2, W3, and W4 is a linear dimension (length) between the right side surface of the second fixing tape 95 and the distal end surface (tip surface) of each of the external terminals 65 of the first terminal 61, the second terminal 62, and the third terminal 63 in the right and left direction. Each of the dimensions W4 and W5 is a linear dimension (length) between the left side surface of the second fixing tape 95 and the distal end surface (tip surface) of each of the external terminals 65 of the fourth terminal 64 in the right and left direction.

The entirety of each the first core member 11*a* and the second core member 11*b* is integrally formed (integrally molded) of a magnetic material.

The entirety of the bobbin part 30 is, for instance, integrally formed (integrally molded) of an insulating material, such as a resin.

The entirety of the cover member 80 is, for instance, integrally formed (integrally molded) of an insulating material, such as a resin.

As shown in FIGS. 3 and 8, for instance, one of the cover member 80 and the bobbin part 30 has the spring piece 83 and the other of the cover member 80 and the bobbin part 30 has the convex (protruding) part 46 and the recessed (concave) part 47. In the present embodiment, as an example, the cover member 80 has the spring piece 83 and the bobbin part 30 has the convex part 46 and the recessed part 47.

More specifically, in the present embodiment, because the spring piece 83 is pressed by the convex part 46, the spring piece 83 is elastically deformed in the second direction. At the same time, the spring piece 83 elastically energizes (urges) the bobbin part 30 toward the first direction.

Further, as shown in FIG. 3, the bobbin part 30 has, for instance, a first side surface 45 and a second side surface 48. Specifically, the first side surface 45 is arranged along (faces) the first wall part 82*a*. The second side surface 48 is arranged along (faces) the second wall part 82*b*. Further, at least one of the first wall part 82*a* and the first side surface 45 has the spring piece 83 and at least the other of the first wall part 82*a* and the first side surface 45 has the convex part 46 and the recessed part 47. Further, the second side surface 48 and the second wall part 82*b* are respectively formed to be flat, and at the same time, they are in surface contact with each other.

More specifically, in the present embodiment, the coil component 100 has the configurations in which when the cover member 80 is attached onto the outer periphery of the bobbin part 30, at least one of the cover member 80 and the bobbin part 30 elastically energizes the other of the cover member 80 and the bobbin part 30 in the first direction (the left direction) by the energizing force of the spring piece 83 and the second side surface 48 and the second wall part 82*b* are in surface contact with each other. Therefore, the positioning or aligning of the cover member 80 relative to the bobbin part 30 can be easily performed without using dedicated jigs or a special tool. In addition, because a state, in which the second side surface 48 and the second wall part 82*b* are in surface contact with each other, is excellently maintained, the displacement of the cover member 80 relative to the bobbin part 30 can also be restricted (regulated or controlled) around each of a Z axis (direction) and a Y axis (direction). Therefore, the state, in which the dimensions W1, W2, W3, and W4 explained above are mutually the same, can be more easily realized and maintained. Further, the state, in which the dimensions W5 and W6 explained above are mutually the same, can be more easily realized and maintained.

In addition, when the dimension of each of the external terminals 65 in the right and left direction is designed, the dimensions between the second side surface 48 and the distal end surfaces (tip surfaces) of each of the external terminals 65 of the first terminal 61, the second terminal 62, and the third terminal 63 and the dimensions between the second side surface 48 and the distal end surfaces (tip surfaces) of each of the external terminals 65 of the fourth terminal 64 are considered. As a result, the configurations explained above can be easily realized. Therefore, the outside dimension of the entire coil component 100 including the external terminals 65 can be designed to be smaller.

More specifically, in the present embodiment, the first wall part 82*a* of the cover member 80 has the spring piece 83 and the first side surface 45 of the bobbin part 30 has the convex part 46 and the recessed part 47.

As shown in FIG. 3, in the present embodiment, the first side surface 45 is configured by the right side surface of the first flange part 41. Further, the second side surface 48 is, for instance, configured by the left side surface of the second flange part 42. Therefore, the first side surface 45 (a reference surface 49 explained below) is orthogonal to the first direction (in the present embodiment, the left direction). In addition, the second side surface 48 is orthogonal to the first direction (in the present embodiment, the left direction). Further, the first side surface 45 is arranged so as to be directed to (face toward) the right direction and the second side surface 48 is arranged so as to be directed to (face toward) the left direction.

Further, the first side surface 45 is arranged nearer to the left side than the spring piece 83. Further, an energizing direction of the spring piece 83 is the left direction (the first direction) and corresponds to the direction to which the second side surface 48 is directed (faces). Therefore, the second side surface 48 is energized toward the left direction (on the side of the second wall part 82*b*) by the spring piece 83 and is excellently in surface contact with an inner surface of the second wall part 82*b*.

As shown in FIG. 8, in the present embodiment, the spring piece 83 is configured by a part of the first wall part 82*a*. Further, the extending direction of the spring piece 83 is a downward direction. In other words, the spring piece 83 is formed by downwardly extending from the upper edge of the through holes 88*a* that is formed in the first wall part 82*a*. That is, the upper end part of the spring piece 83 configures one end part 83*a*. Further, the upper end part of the spring piece 83 is supported by the first wall part 82*a*. More specifically, the upper end part of the spring piece 83 is a fixed end. The lower end part of the spring piece 83 that configures the tip part 83*c* is a free end.

Further, in the following explanations, the part other than the spring piece 83 of the first wall part 82*a* is referred to as "a main portion (main part) 821*a*."

Further, in the present embodiment, the spring piece 83 may be arranged at least along the first side surface 45 of the bobbin part 30. Therefore, for instance, the spring piece 83 may also be configured by a part of the top surface 81 and a part of the first wall part 82*a*.

As shown in FIGS. 1, 2, and 8, the spring piece 83 is, for instance, formed at each of the front and rear parts of the first wall part 82*a* so as to sandwich the through hole 36 of the bobbin part 30 in the front and rear direction. In other words, the through hole 36 is arranged between the spring piece 83 located at the front side (front spring piece 83) and the spring piece 83 located at the rear side (rear spring piece 83). As explained above, two spring pieces 83 are formed side by side along the front and rear direction which is orthogonal to the first direction. As a result, the structure, in which the spring pieces 83 more excellently elastically energize the first side surface 45 in the first direction, can be realized, and at the same time, the front and rear sides of the bobbin part 30 can be respectively pressed with a good balance. As a result, the displacement of the cover member 80 relative to the bobbin part 30 can also be restricted (regulated or controlled) around each of the Z axis (direction) and Y axis (direction).

The spring pieces 83, for instance, mutually extend in parallel to each other.

Each of the spring pieces 83 is, for instance, a flat spring that is formed to be in a substantially flat plate shape.

When viewed along the first direction (the left direction), the shape of each of the spring pieces 83 is, for instance, formed to be in a substantially rectangular shape that has a long-length in the vertical direction. Further, the thickness dimension of each of the spring pieces 83 is substantially constant regardless of the height position in the vertical direction and is designed to be the same as the thickness dimension of the first wall part 82*a*.

Further, as shown in FIG. 6, the spring piece 83 is bent to be convex toward the second direction (the right direction), and at the same time, is bent to be convex toward the first direction (the left direction).

More specifically, for instance, each of the spring pieces 83 includes the one end part 83*a* in which the upper end is supported by the main portion 821*a* of the first wall part 82*a* and the tip part 83*c* that is continuously connected to the lower end of the one end part 83*a*. Further, the tip part 83*c* includes a middle part 832 that is continuously connected to the one end part 83*a* and a most distal end 833 that is connected to the middle part 832.

The one end part 83*a* extends downward from the upper edge of the through holes 88*a*. The middle part 832 is bent so that a displacement amount to the left side increases downward from the lower edge of the one end part 83*a*. The most distal end 833 extends downward from the lower edge of the middle part 832.

More specifically, a boundary part between the outer surface of the one end part 83*a* and the outer surface of the middle part 832 projects, for instance, outward (toward the external side) than the outer surface of the first wall part 82*a*. Further, it is preferred that a boundary part between an inner surface 831*b* of the middle part 832 and an inner surface 831*c* of the most distal end 833 projects, for instance, inward (toward an inner side) than the inner surface of the first wall part 82*a*.

In the present embodiment, as explained above, the space is formed between the inner side surface 12*c* of the base 12 of the first core member 11*a* and the outer surface of the first wall part 82*a* (refer to FIG. 4). Thus, even when a part of the spring piece 83 projects outward (to the right side) than the outer surface of the first wall part 82*a*, it is suppressed that the spring piece 83 and the base 12 interfere with each other.

Each of the spring pieces 83 is, for instance, integrally formed with the cover member 80. Therefore, the spring pieces 83 are made of a resin material of the same kind as a resin material that forms the cover member 80.

However, the spring piece(s) 83, for instance, may be incorporated into the cover member 80 by an insert molding. In this case, the spring piece(s) 83 is made of a metal. Further, the spring piece(s) 83 may be formed as a separate body from the cover member 80, and for instance, may be fixed to the cover member 80 by such as an adhesive material. In this case, the spring piece(s) 83 may be made of a resin material of the same kind as a resin material that forms the cover member 80 or may also be made of the other material such as a metal.

Further, as shown in FIGS. 1 and 2, a set of the convex part 46 and the recessed part 47 is formed at the positions corresponding to the pair of spring pieces 83 on the first side surface 45 (the right side surface of the first flange part 41). Therefore, as an example, the set of the convex part 46 and the recessed part 47 is formed at each of the front and rear parts of the first side surface 45 by sandwiching the through hole 36. In other words, the through hole 36 is arranged between the convex part 46 and the recessed part 47 on the front side and the convex part 46 and the recessed part 47 on the rear side.

It is preferred that at least a part of the convex part 46 is tilted (inclined) in a direction in which an elastic restoring force of the spring piece 83 increases toward the direction of the attachment of the cover member 80 relative to the bobbin part 30. As shown in FIG. 6, in the present embodiment, as an example, the projection amount of the convex part 46 to the second direction (the right direction) increases toward the lower part.

Further, it is preferred that the projection amount of the convex part 46 toward the side of the spring piece 83 is the largest (becomes a maximum value) at a position of an end part (end) 46*b* on the side of the recessed part 47.

Thus, a pressing force of the spring piece 83 against the end part 46*b* can be sufficiently ensured and a state, in which the tip part 83*c* (of the spring piece 83) is locked to (engaged with) the end part 46*b* (of the convex part 46), can be excellently maintained. Therefore, because the state, in which the cover member 80 energizes the bobbin part 30 upward, can be excellently maintained, it can be restricted (regulated or controlled) more securely that the bobbin part 30 is detached from the cover member 80.

In the present embodiment, as shown in FIG. 6, the first side surface 45 further has a pair of front and rear guide parts 45*b* and the reference surface 49 in addition to each of the convex parts 46 and the recessed parts 47. Specifically, the pair of front and rear guide parts 45*b* are arranged at the upper sides of each of the convex parts 46. Further, the reference surface 49 is the remaining part other than the convex parts 46, the recessed parts 47, and the guide parts 45*b* on the first side surface 45.

As shown in FIGS. 3, 6, and 9B, the recessed part 47 is recessed toward the left side (left direction) than the convex part 46. More specifically, each of the recessed parts 47 is arranged on the same plane with the reference surface 49 and is a flat surface orthogonal to the first direction. Further, the lower edge of each of the recessed parts 47 is continuously connected to the left edge of the upper surface of the first terminal holding part 52.

The convex part 46 projects from the recessed part 47 toward the right direction (the side of the first wall part 82*a*). More specifically, the convex part 46 has, for instance, a tilted surface and a step surface (step) 46*a*. The tilted surface is tilted to the direction being displaced to the right side toward the lower side (direction). The step surface 46*a* is a boundary part between the convex part 46 and the recessed part 47. In the present embodiment, the lower edge of the tilted surface of the convex part 46 is the end part 46*b*. Further, the step surface 46*a* is arranged so as to extend (span) from the end part 46*b* to the upper edge of the recessed part 47.

The upper edge of each of the convex parts 46 is continuously connected to the lower edge of the corresponding guide part 45*b*. The left edge of the step surface 46*a* is continuously connected to the upper edge of the corresponding recessed part 47. Further, in the present embodiment, the step surface 46*a* is formed to be flat and is horizontally arranged. A dimension in the right and left direction (a difference in height between the convex part 46 and the recessed part 47) of the step surface 46*a* is substantially constant regardless of the positions in a width direction (the front and rear direction) of the step surface 46*a*.

Further, the tilted surface of the convex part 46 has a shape (configuration) in which the plane surface orthogonal to the right and left direction is tilted to the direction being displaced to the right side toward the lower direction around an axis extending in the front and rear direction. Therefore, on the tilted surface, when the positions in the vertical (up and down) direction (height) are the same, the projection amounts (the projection amount using the recessed part 47 as a reference) toward the right direction are the same regardless of the positions in the width direction (the front and rear direction).

Further, the present application is not limited to the above configuration. For instance, the convex part 46 may not have the tilted surface and the outer side surface of the convex part 46 may be a flat surface orthogonal to the first direction.

The pair of front and rear guide parts 45*b* are recessed toward the left side than the reference surface 49. More specifically, the recessed amount of each of the pair of front and rear guide parts 45*b* increases in a tapered shape toward the upper direction (side). The front guide part 45*b* is formed continuously to the front convex part 46. The rear guide part 45*b* is formed continuously to the rear convex part 46. Further, each of the guide parts 45*b* is, for instance, formed so as to extend from the upper end surface of the first flange part 41 to the upper edge of the convex part 46.

Further, at a center in the front and rear direction of the upper end part of the first flange part 41, a notch shape part 45*a*, which is opened toward each of the upper direction, the right direction, and the left direction, is formed (refer to FIGS. 9A and 9C). The front guide part 45*b* is arranged at the front side than the notch shape part 45*a*. The rear guide part 45*b* is arranged at the rear side than the notch shape part 45*a*.

In the present embodiment, an inclination angle of the guide part 45*b* relative to the reference surface 49 and an inclination angle of the convex part 46 relative to the reference surface 49 are mutually set to be the same inclination angle. The tilted surface of the guide part 45*b* and the tilted surface of the convex part 46 are mutually arranged on an extension plane. In other words, the tilted surface of the guide part 45*b* and the tilted surface of the convex part 46 are mutually arranged on the same plane (refer to FIGS. 6 and 9B). Further, the width dimension (the dimension in the front and rear direction) of the guide part 45*b* and the width dimension (the dimension in the front and rear direction) of the convex part 46 are mutually set to be the same dimension. Therefore, the tilted surface including the tilted surface of the guide part 45*b* and the tilted surface of the convex part 46 is a series tilted surface (of a predetermined inclination angle) that is long in vertical direction. Further, the inclination angle of the tilted surface including the tilted surface of the guide part 45*b* and the tilted surface of the convex part 46 may be changed to be in a curve shape in a quadratic curve shape state.

In the present embodiment, when the cover member 80 is attached onto the outer periphery of the bobbin part 30, the spring piece 83 is pressed by the convex part 46 toward the right side and is elastically deformed toward the second direction so that the spring piece 83 swings. More specifically, the tips 83*c* of the pair of spring pieces 83 are guided to the convex parts 46 along the corresponding guide parts 45*b*, and thereafter, store the spring force while being slid downward along the tilted surface of the convex part 46. Thus, the spring pieces 83 become in a state being elastically deformed to the maximum when the spring pieces 83 slide over the end part 46*b* on the side of the recessed part 47 in the convex part 46. Thereafter, while a part of the stored spring force of the spring pieces 83 is released (while the elasticity is restored), an entering part(s) 84*b* of the tip part(s) 83*c* falls into the recessed part(s) 47 and the tip part(s) 83*c* of the spring piece(s) 83 is locked to (engaged with) the convex part(s) 46.

As explained above, in the present embodiment, in a state in which the spring piece 83 has a surplus capacity (force) (in a state in which the elastic deformation amount of the spring piece 83 is small as compared with the state in which the spring piece 83 is elastically deformed to the maximum), because the spring piece 83 is locked to (engaged with) the convex part 46, creep (a creep deformation) can be unlikely to be generated in the resin material of the spring piece 83. As a result, a spring characteristic of the spring piece 83 is excellently maintained. Further, as compared with a case in which the spring piece 83 is locked to (engaged with) the convex part 46 in the state being elastically deformed to the maximum, because the elastic deformation amount toward the second direction (the right direction) of the spring piece 83 becomes smaller, the dimension in the right and left direction of the cover member 80 can be designed to be smaller.

Furthermore, when the cover member 80 is attempted to be pulled out upward from the bobbin part 30, the spring piece 83 needs to slide over the end part 46*b* of the convex part 46 again. Therefore, the spring piece 83 swings while being elastically deformed toward the second direction. As a result, even if the spring force of the spring piece 83 is weakened, the spring force of the spring piece 83 can be expected to be sufficiently exhibited in the above attempt. Therefore, the cover member 80 is suppressed to be pulled out from the bobbin part 30.

Further, as shown in FIG. 6, it is preferred that the entering part 84*b* is not in contact with the other (in the present embodiment, the bobbin part 30).

As a result, since the upward pressing force of the spring piece 83 against the end part 46*b* of the convex part 46 can be sufficiently ensured, it can be restricted (regulated or controlled) more securely that the bobbin part 30 is detached from the cover member 80, and at the same time, a state, in which the lower surface of the flange part 86 is in surface contact (pressed contact) with the bobbin part 30, can be excellently maintained.

Further, it is preferred that the contact part 84*a* is in line contact or is in point contact with the other (in the present embodiment, the bobbin part 30).

As a result, the size of an area, in which the contact part 84*a* (of the spring piece 83) is in contact with the bobbin part 30, can be reduced. Therefore, regardless of a dimension and an inclination angle of the part of the bobbin part 30 that comes in contact with the contact part 84*a*, the spring piece 83 can be properly positioned (at an intended position) relative to the bobbin part 30.

However, the contact part 84*a*, for instance, may be in surface contact. In this case, for instance, it is preferred that the height dimension (the vertical dimension) is smaller than the width dimension (the front and rear direction) with respect to the contact part 84*a*. Further, with respect to the contact part 84*a*, when the height dimension becomes furthermore smaller than the width dimension, it becomes the line contact. That is, the line contact between the contact part 84*a* and the bobbin part 30 means a state in which the height dimension is significantly smaller than the width dimension with respect to the contact part 84*a*.

Further, it is more preferred that a part 83*b* that is arranged nearer to the base end side than the contact part 84*a* of the spring piece 83 is separated (spaced apart) from the other (in the present embodiment, the bobbin part 30).

As a result, the size of an area in which the contact part 84*a* (the spring piece 83) is in contact with the bobbin part 30 can be more reduced (smaller). Therefore, regardless of the dimension and the inclination angle of the part of the bobbin part 30 that comes in contact with the contact part 84*a*, the spring piece 83 can be properly positioned (at the intended position) relative to the bobbin part 30.

In the present embodiment, as shown in FIG. 6, a part of the inner surface 831*b* of the middle part 832 is the contact part 84*a* that is in contact with the convex part 46. The contact part 84*a* is, for instance, in line contact with the end part 46*b* (the right edge of the step surface 46*a*), which is on the side of the recessed part 47, of the convex part 46 along the front and rear direction. Further, in the present embodiment, with respect to the tip part 83*c*, a part, that is located lower than the contact part 84*a* (the tip side), and at the same time, located nearer to the side of the first direction than the contact part 84*a*, is the entering part 84*b*.

More specifically, the middle part 832 is, for instance, tilted to the direction being displaced to the right side toward the upper side. Therefore, because the spring piece 83 elastically energizes the bobbin part 30, the force for pushing up to the upper left side relative to the end part 46*b* being on the side of the recessed part 47 of the convex part 46 is applied.

The most distal end 833 is, for instance, tilted to the direction being displaced to the right side toward the down side. Further, the boundary part between the inner surface 831*b* of the middle part 832 and the inner surface 831*c* of the most distal end 833 is arranged nearer to the left side (the side of the first direction) than the right edge of the step surface 46*a*. More specifically, a part being lower than the contact part 84*a* of the inner surface 831*b* and the inner surface 831*c* (the entering part 84*b*) of the most distal end 833 are respectively arranged nearer to the left side than the right edge of the step surface 46*a*. The outer surface of the middle part 832 and the outer surface of the most distal end 833 are arranged nearer to the right side than the right edge of the step surface 46*a*. Further, with respect to the tip part 83*c*, the part (of the tip part 83*c*) being lower than the contact part 84*a* is not in contact with the recessed part 47.

Further, in the present embodiment, each of the part being lower than the contact part 84*a* (the tip side) of the inner surface 831*b* of the middle part 832 and the inner surface 831*c* of the most distal end 833 is arranged nearer to the left side (the side of the first direction) than the contact part 84*a* and enters the recessed part 47.

However, an entirety of the inner surface 831*c* of the most distal end 833 may not necessarily be arranged nearer to the left side than the contact part 84*a*. For instance, a part of the inner surface 831*c* may be arranged nearer to the right side than the right edge of the step surface 46*a*. Further, the spring piece 83 may not necessarily have the most distal end 833.

Here, FIG. 7 shows a state before the cover member 80 is attached onto the outer periphery of the bobbin part 30, i.e., no external force is applied to the spring piece 83. In FIG. 7, the convex part 46 and the recessed part 47 are respectively indicated by a two-dot chain line for the sake of convenience.

As shown in FIG. 7, in the state before the cover member 80 is attached onto the outer periphery of the bobbin part 30, the outer and inner surfaces of the one end part 83*a* are, for instance, respectively orthogonal to the right and left direction. Further, the outer surface of the one end part 83*a* is, for instance, arranged on the same plane with the outer surface of the main portion 821*a*. Further, the inner surface of the one end part 83*a* is, for instance, arranged on the same plane with the inner surface of the main portion 821*a*.

Similarly, in the state before the cover member 80 is attached onto the outer periphery of the bobbin part 30, the outer surface and the inner surface 831*c* of the most distal end 833 are, for instance, respectively orthogonal to the right and left direction. However, the outer surface of the most distal end 833 is arranged toward an inside than the outer surface of the main portion 821*a*. Further, the inner surface 831*c* of the most distal end 833 is arranged toward the inside than the inner surface of the main portion 821*a*.

Further, in the state before the cover member 80 is attached onto the outer periphery of the bobbin part 30, for instance, the outer surface of the middle part 832 is arranged toward the inside than the outer surface of the main portion 821*a*. Further, the inner surface 831*b* of the middle part 832 is arranged toward the inside than the inner surface of the main portion 821*a*.

Therefore, in the state before the cover member 80 is attached onto the outer periphery of the bobbin part 30, a part of the spring piece 83 (for instance, the middle part 832 and the most distal end 833) is arranged nearer to the side of the first direction than the main portion 821*a*. More specifically, as shown in FIG. 7, a part of the spring piece 83 (the inner surface 831*b* of the middle part 832 and the inner surface 831*c* of the most distal end 833) is arranged nearer to the left side than the right side edge of the step surface 46*a*.

As a result, even when there is the production variation of the dimension of the bobbin part 30 in the first direction, the cover member 80 can excellently elastically energize the first side surface 45 (the bobbin part 30) because the spring piece 83 is stably in contact with the convex part 46.

The coil component 100 according to the embodiments of the present application is configured as explained above. As an example, the coil component 100 explained above can be used as a high breakdown voltage pulse transformer. However, the use of the coil component 100 is not limited to this example.

The assembly of the coil component 100, for instance, can be performed as the following steps.

First, each of the winding wires 71 of the coil (the first and second coils) is wound around the tubular part 31 of the bobbin part 30. Ends of each of the winding wires 71 are respectively entwined to connection terminals (not shown) of the corresponding terminals 60 and are fixed by welding or soldering.

Next, the cover member 80 is attached onto the bobbin part 30 from above. At this time, for instance, the tip part 83*c* of the spring piece 83 is firstly arranged on the corresponding guide part 45*b* of the first side surface 45. Thereafter, when the cover member 80 is pushed downward relative to the bobbin part 30, the entering part 84*b* of the spring piece 83 is elastically deformed while being slid downward along each of the tilted surface of the guide part 45*b* and the tilted surface of the convex part 46. As a result, because the convex part 46 receives the energizing force from the spring piece 83, the inner surface of the second wall part 82*b* comes in surface contact with the second side surface 48. Thereafter, when the entering part 84*b* goes (slides) over the end part 46*b* of the convex part 46, the spring piece 83 is elastically restored. In this elastic restoration, the bobbin part 30 is pushed up relative to the cover member 80 by the spring force of the spring piece 83 and the lower surface of the flange part 86 is in pressed contact (in surface contact) with the bobbin part 30. In this way, the cover member 80 is attached onto the outer periphery of the bobbin part 30. However, for instance, when the cover member 80 is attached onto the bobbin part 30 from above, the cover member 80 may be pushed downward relative to the bobbin part 30 until the lower surface of the flange part 86 comes in surface contact with the bobbin part 30.

Next, while the core part 15 of the first core member 11*a* is inserted into the through hole 36 from (through) the through holes 88*a*, the core part 15 of the second core member 11*b* is inserted into the through hole 36 from (through) the through hole 88*b*.

Next, the first fixing tape 90 is wound around the magnetic core 10 at least once or more. As a result, the magnetic core 10 can be fixed to the cover member 80 and the bobbin part 30. Further, the second fixing tape 95 is wound around each of the first fixing tape 90 and the second circumferential side wall part 85 of the cover member 80 at least once or more (refer to FIGS. 4 and 6). As a result, the magnetic core 10 can be more securely fixed to the cover member 80 and the bobbin part 30. According to the above described steps, the coil component 100 can be obtained (assembled).

As explained above, it is preferred that at least the part of the convex part 46 is tilted in the direction in which the elastic restoring force of the spring piece 83 increases toward the direction of the attachment of the cover member 80 relative to the bobbin part 30.

As a result, when the cover member 80 is pushed downward relative to the bobbin part 30, the elastic deformation amount of the spring piece 83 can smoothly increase toward the direction of the attachment of the cover member 80 relative to the bobbin part 30. In addition, as explained above, the spring piece 83 has the cantilever structure in which the upper end (the one end part 83*a*) of the spring piece 83 in the direction of the attachment of the cover member 80 relative to the bobbin part 30 is supported. As a result, in the present embodiment, in a case in which the projection amount of the convex part 46 to the second direction increases toward the direction of the attachment (the lower direction), the spring piece 83 can be smoothly elastically deformed along the shape of the convex part 46.

The embodiments of the present application are explained above with reference to the drawings. It will be apparent that the same may be varied in many ways.

Figure 11:
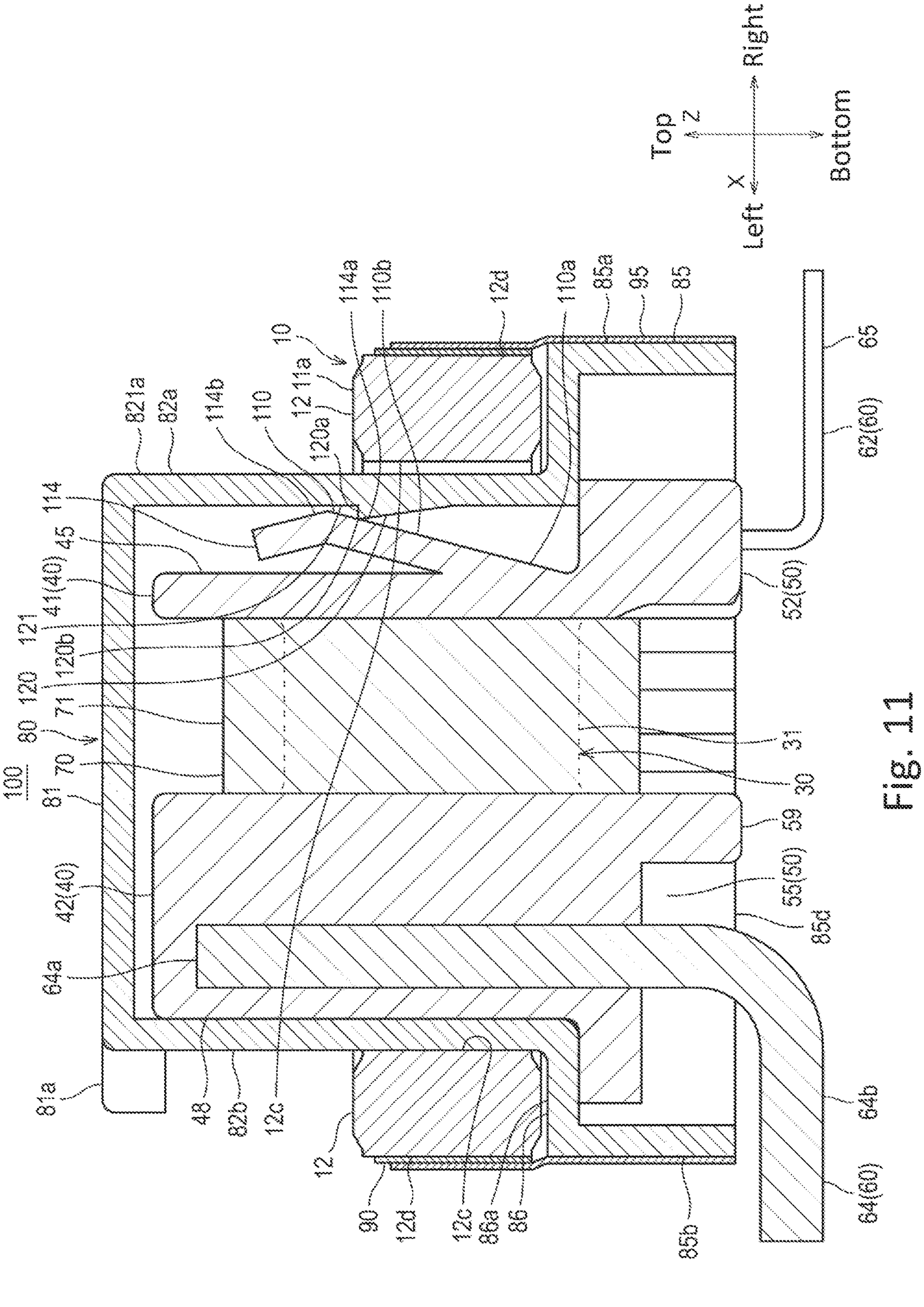
FIG. 11 is a cross-sectional view along the line B-B shown in FIG. 10 that shows the coil component according to the variations of the embodiments of the present application.
Figure 12:
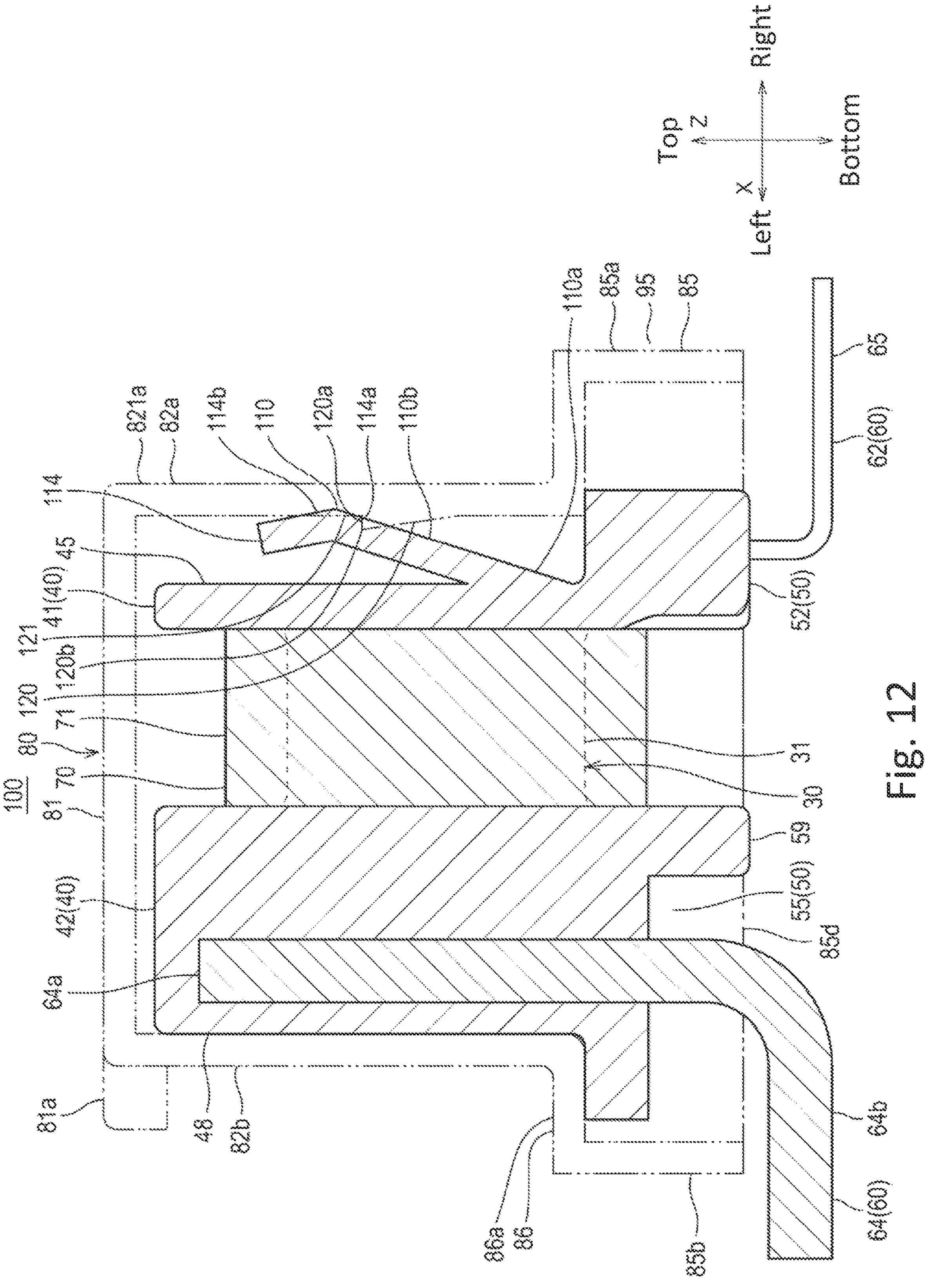
FIG. 12 is a cross-sectional view along the line B-B shown in FIG. 10 that shows the bobbin part according to the variations of the embodiments of the present application.

For instance, it has been explained above that the cover member 80 elastically energizes the bobbin part 30. However, the present application is not limited to this example. As shown in FIGS. 11 and 12, the bobbin part 30 may elastically energize the cover member 80. That is, the bobbin part 30 may be elastically deformed and the bobbin part 30 may elastically energize the cover member 80 by the elastic restoring force.

In this case, the bobbin part 30 has a spring piece 110 that elastically energizes the cover member 80 and the cover member 80 has a convex part 120 and a recessed part 121 that is recessed toward the side of the first direction than the convex part 120. In this case, for instance, the right direction is the first direction. The left direction is the opposite direction (the second direction) of the first direction.

Specifically, the spring piece 110 has a cantilever structure. Further, in the cantilever structure, one end part 110*a* of the spring piece 110 in a direction of the attachment of the cover member 80 relative to the bobbin part 30 is supported by the bobbin part 30. Further, at the same time, the spring piece 110 extends from the one end part 110*a* toward a tip part 114 of the spring piece 110.

The tip part 114 of the spring piece 110 has a contact part 114*a* and an entering part 114*b*.

Specifically, the contact part 114*a* energizes the convex part 120 of the cover member 80 by coming into contact with the convex part 120. The entering part 114*b* is located nearer to a tip side than the contact part 114*a* and enters the recessed part 121. Since the spring piece 110 is bent, the entering part 114*b* is located nearer to the side of the first direction than the contact part 114*a*. Further, at the same time, since the spring piece 110 is bent, the force, in which the cover member 80 energizes the bobbin part 30 upward at a contact portion between the contact part 114*a* and the convex part 120, is generated.

In addition, it is preferred that the entering part 114*b* of the bobbin part 30 does not contact (has a non-contact state) with respect to the cover member 80.

Further, it is also preferred that a projection amount of the convex part 120 that projects toward the side of the spring piece 110 becomes a maximum value (is the largest) at a position of an end part (end) 120*b* (for example, the left side of a step surface (step) 120*a*) on the side of the recessed part 121.

In addition, it is preferred that a part 110*b* that is arranged nearer to a base end side than the contact part 114*a* of the spring piece 110 is separated (spaced apart) from the cover member 80.

FIG. 12 shows a state prior to the attachment of the cover member 80 relative to the bobbin part 30. That is, FIG. 12 shows a state in which an external force is not applied to the spring piece 110. In FIG. 12, the cover member 80 is indicated by a two-dot chain line for the sake of convenience.

Further, in the present application, as shown in FIGS. 10, 11, 12, and 13, the cover member 80 may elastically energize the bobbin part 30, and at the same time, the bobbin part 30 may elastically energize the cover member 80. That is, the cover member 80 may be elastically deformed and the cover member 80 may elastically energize the bobbin part 30 by the elastic restoring force, and at the same time, the bobbin part 30 may be elastically deformed and the bobbin part 30 may elastically energize the cover member 80 by the elastic restoring force.

In this case, the direction in which the cover member 80 elastically energizes the bobbin part 30 and the direction in which the bobbin part 30 elastically energizes the cover member 80 may be respectively in the parallel direction to the mounting surface, and at the same time, may be the different directions each other (for instance, the directions orthogonal to each other). In other words, for instance, the cover member 80 may elastically energize the bobbin part 30 at the first direction, and the bobbin part 30 may elastically energize the cover member 80 at the second direction. Further, the cover member 80 may elastically energize the bobbin part 30 toward the first direction, and the bobbin part 30 may elastically energize the cover member 80 toward the second direction. The above described directions can be reversed or opposite directions.

Specifically, in the variations of the embodiments shown in FIGS. 10-13, the front side of the first wall part 82*a* of the cover member 80 has the spring piece 83 in the same manner as the above described embodiments shown in, for example, FIGS. 1-9, of the present application. In addition, at the same time, the rear side of the first side surface 45 of the bobbin part 30 has the spring piece 110 described above. Further, the rear side of the first wall part 82*a* of the cover member 80 has the convex part 120 and the recessed part 121 that face (correspond to) the spring piece 110. In addition, at the same time, the front side of the first side surface 45 of the bobbin part 30 has the convex part 46 and the recessed part 47 that face (correspond to) the spring piece 83.

Figure 10:
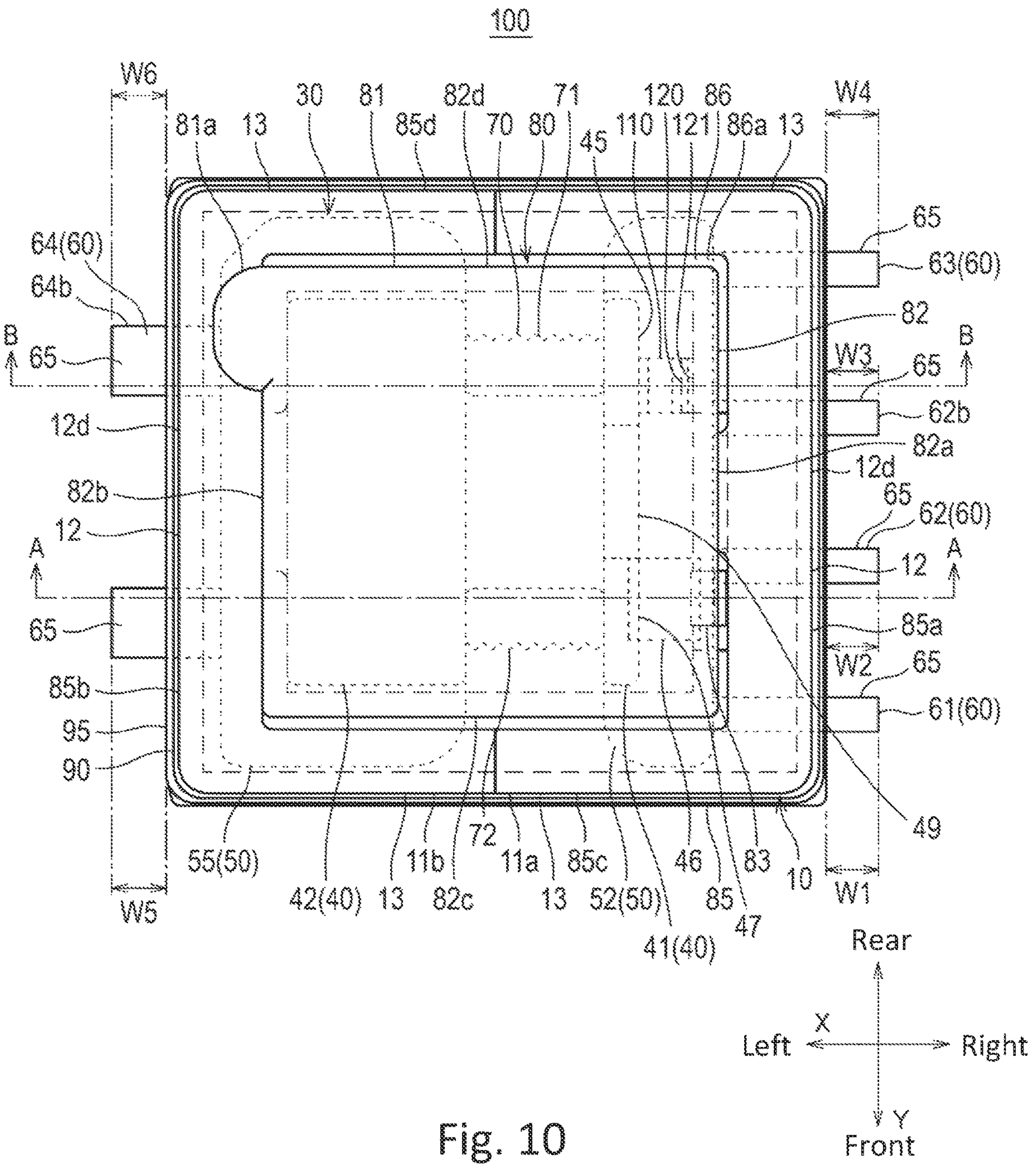
FIG. 10 is a top view that shows a coil component according to variations of the embodiments of the present application. Specifically.
Figure 13:
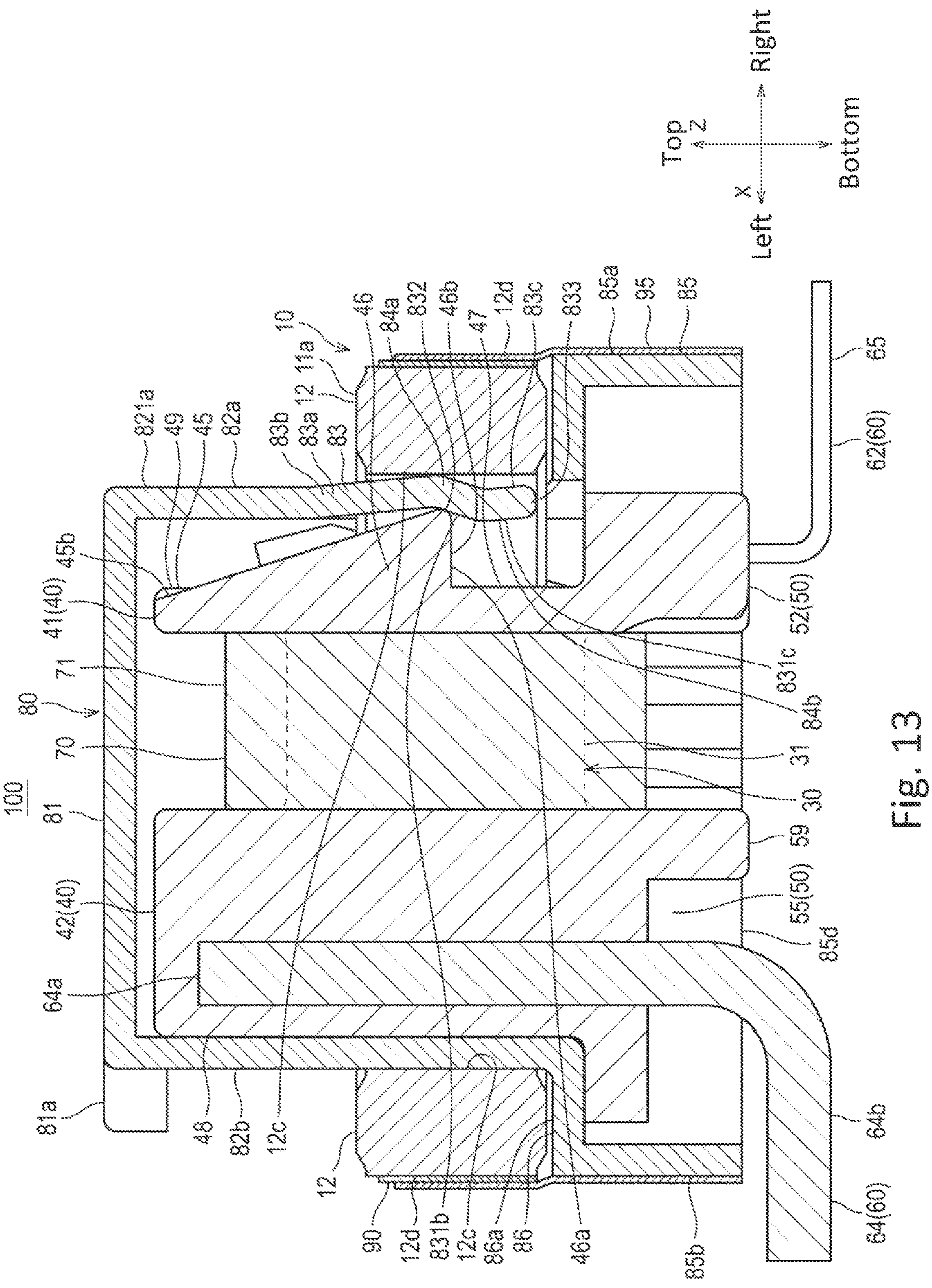
FIG. 13 is a cross-sectional view along the line A-A shown in FIG. 10 that shows the coil component according to the variations of the embodiments of the present application.

In the variations of the embodiments shown in FIGS. 10 and 13, the projection amount of the convex part 46 is larger than the above described embodiments shown in, for example, FIGS. 1-9. Further, in the variations of the embodiments shown in FIGS. 10 and 13, since the dimension in the right and left direction of the cover member 80 is larger than the above described embodiments shown in, for example, FIGS. 1-9, the first side wall part 82*a* shown in FIGS. 10 and 13 is arranged further to the right side than the above described embodiments shown in, for example, FIGS. 1-9.

Further, it has been explained above that the cover member 80 elastically energizes the bobbin part 30 toward the first direction. However, the present application is not limited to this example. The cover member 80 may elastically energize the bobbin part 30 toward both of the first and second directions.

More specifically, for instance, the cover member 80 may have the spring piece 83 that elastically energizes the bobbin part 30 on both sides of the first direction (the first wall part 82*a*) and the second direction (the second wall part 82*b*). In this case, it is preferred that the convex part 46 and the recessed part 47 are respectively formed on both sides of the first side surface 45 and the second side surface 48 of the bobbin part 30.

As a result, the force in which the spring piece 83 on the side of the first direction pushes up the bobbin part 30 toward the upper left direction and the force in which the spring piece 83 on the side of the second direction pushes up the bobbin part 30 toward the upper right direction are applied. Therefore, although the force to the left direction by the spring piece 83 on the side of the first direction and the force to the right direction by the spring piece 83 on the side of the second direction are mutually balanced out, the forces upward (toward the upper side) of both of spring piece 83 on the side of the first direction and spring piece 83 on the side of the second direction are added. As a result, the resultant force of each of the spring pieces 83 is substantially directed upward (toward the upper direction). Therefore, because the rotating forces around the Y axis (direction) by the spring pieces 83 are balanced out, the inclination of the cover member 80 in the vertical direction can be suppressed.

Further, also in this case, as explained above, the bobbin part 30 may elastically energize the cover member 80. That is, the bobbin part 30 may elastically energize the cover member 80 toward both of the first and second directions.

Further, is has been explained above that the magnetic core 10 is configured with two E-type cores. However, the present application is not limited to this example. The magnetic core 10 may be configured with one E-type core and one I-type core.

Further, the magnetic core 10 may be configured with two T-type cores or may be configured with one T-type core and one I-type core. In this case, the entire shape of the magnetic core 10 is formed to be H-shaped in the plan view.

Further, it has been explained above that the magnetic core 10 has the core part 15. However, the magnetic core 10 may has a configuration in which there is no core part 15. That is, the magnetic core 10 may be configured with two core members that are respectively U-shaped or may be configured with one U-shaped core member and one I-shaped core member. In this case, the entire shape of the magnetic core 10 is in a rectangular annular shape in the plan view.

Further, it has been explained above that the magnetic core 10 has the two members (the first core member 11*a* and the second core member 11*b*). However, the entire magnetic core 10 may be integrally formed (monolithic configuration) or may be configured with three or more members.

Further, it has been explained above that the extending direction of the spring piece 83 is the downward direction. However, for instance, the extending direction of the spring piece 83 may be in the upward direction. In this case, for instance, the spring piece 83 is formed so as to extend upward from the lower edge of the through holes 88*a* that is formed in the first wall part 82*a*. That is, the upper end of the spring piece 83 may be the free end (configures the tip part 83*c*) and the lower end of the spring piece 83 may be the fixed end (the one end part 83*a*).

The embodiments of the present application include the following technical ideas or technical concepts.

<1> A coil component including:

a bobbin;

a magnetic core that is inserted into the bobbin;

a coil that is wound around the bobbin; and a cover member that is attached onto the bobbin along an attachment direction, wherein at least one of the cover member and the bobbin has a spring piece, and the spring piece of one of the cover member and the bobbin elastically energizes the other of the cover member and the bobbin along a first direction parallel to a mounting surface, the spring piece extends along the attachment direction and has one end and a tip end opposite to the one end, and the spring piece has a cantilever structure in which the one end is supported, the spring piece further has a contact part and an entering part, the entering part is located closer to the tip end of the spring piece than the contact part, and the entering part is located further in the first direction than the contact part, the other of the cover member and the bobbin has a convex part and a recessed part, the recessed part is recessed in the first direction, and the recessed part is located further in the first direction than the convex part, the recessed part is located closer to the tip end of the spring piece than the convex part along the attachment direction, the contact part of the spring piece is configured to contact and energize the convex part at a contact position, and the entering part of the spring piece is configured to enter into the recessed part, and the spring piece is bent to generate an energizing force, and the cover member is configured to energize the bobbin upward at the contact position by the energizing force.

<2> The coil component according to <1>, wherein the entering part of the spring piece is spaced apart from the other of the cover member and the bobbin.

<3> The coil component according to <1> or <2>, wherein at least part of the convex part has a surface, and the surface is tilted in a direction in which an elastic restoring force of the spring piece increases toward the attachment direction.

<4> The coil component according to <3>, wherein a projection amount of the convex part toward the spring piece is the largest at an end of the convex part adjacent to the recessed part.

<5> The coil component according to any one of <1>-<4>, wherein a first part of the spring piece is spaced apart from the other of the cover member and the bobbin, and the first part is located between the one end and the contact part along the attachment direction.

<6> The coil component according to <5>, wherein the contact part is in line contact with or in point contact with the other of the cover member and the bobbin.

<7> The coil component according to any one of <1>-<6>, wherein one of the cover member and the bobbin has the spring piece, and the other of the cover member and the bobbin has the convex part and the recessed part.

<8> The coil component according to any one of <1>-<6>, wherein the cover member has a side circumferential wall part, and the side circumferential wall part includes a first wall part and a second wall part facing each other, the bobbin has a first side surface and a second side surface outwardly opposite to each other, the first side surface is arranged along the first wall part, and the second side surface is arranged along the second wall part, at least one of the first wall part and the first side surface has the spring piece, and the other of the first wall part and the first side surface has the convex part and the recessed part, and the second wall part and the second side surface are respectively formed to be flat and are in surface contact with each other.

<9> The coil component according to <8>, wherein the cover member has a flange part, and the flange part outwardly extends from a bottom end of the side circumferential wall part of the cover member, and a lower surface of the flange part is in surface contact with the bobbin.

The coil component being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims. Further, the above embodiments can be combined with each other and such combinations are not to be regarded as a departure from the spirit and scope of the invention.

What is claimed is:

1. A coil component comprising:

a bobbin;

a magnetic core that is inserted into the bobbin;

a coil that is wound around the bobbin; and a cover member that is attached onto the bobbin along an attachment direction, wherein the cover member has a spring piece, and the spring piece of the cover member elastically energizes the bobbin along a first direction parallel to a mounting surface, the spring piece extends along the attachment direction and has one end and a tip end opposite to the one end, and the spring piece has a cantilever structure in which the one end is supported, the spring piece further has a contact part and an entering part, the entering part is located closer to the tip end of the spring piece than the contact part, and the entering part is located further in the first direction than the contact part, the bobbin has a convex part and a recessed part, the recessed part is recessed in the first direction, and the recessed part is located further in the first direction than the convex part, the recessed part is located closer to the tip end of the spring piece than the convex part along the attachment direction, the contact part of the spring piece is configured to contact and energize the convex part at a contact position, and the entering part of the spring piece is configured to enter into the recessed part, the spring piece is bent to generate an energizing force, and the cover member is configured to energize the bobbin upward at the contact position by the energizing force, the spring piece is aligned with the convex part along the first direction, and the spring piece is pressed by a tip of the convex portion and is elastically deformed in a direction opposite to the first direction.

2. The coil component according to claim 1, wherein the entering part of the spring piece is spaced apart from the bobbin.

3. The coil component according to claim 1, wherein at least part of the convex part has a surface, and the surface is tilted in a direction in which an elastic restoring force of the spring piece increases toward the attachment direction.

4. The coil component according to claim 3, wherein a projection amount of the convex part toward the spring piece is the largest at an end of the convex part adjacent to the recessed part.

5. The coil component according to claim 2, wherein at least part of the convex part has a surface, and the surface is tilted in a direction in which an elastic restoring force of the spring piece increases toward the attachment direction.

6. The coil component according to claim 5, wherein a projection amount of the convex part toward the spring piece is the largest at an end of the convex part adjacent to the recessed part.

7. The coil component according to claim 1, wherein a first part of the spring piece is spaced apart from the bobbin, and the first part is located between the one end and the contact part along the attachment direction.

8. The coil component according to claim 7, wherein the contact part is in line contact with or in point contact with the bobbin.

9. The coil component according to claim 2, wherein a first part of the spring piece is spaced apart from the bobbin, and the first part is located between the one end and the contact part along the attachment direction.

10. The coil component according to claim 9, wherein the contact part is in line contact with or in point contact with the bobbin.

11. The coil component according to claim 3, wherein a first part of the spring piece is spaced apart from the bobbin, and the first part is located between the one end and the contact part along the attachment direction.

12. The coil component according to claim 11, wherein the contact part is in line contact with or in point contact with the bobbin.

13. The coil component according to claim 1, wherein the cover member has a side circumferential wall, and the side circumferential wall includes a first wall part and a second wall part facing each other,
the bobbin has a first side surface and a second side surface outwardly opposite to each other, the first side surface is arranged along the first wall part, and the second side surface is arranged along the second wall part,
the first wall part has the spring piece, and the first side surface has the convex part and the recessed part, and
the second wall part and the second side surface are respectively formed to be flat and are in surface contact with each other.

14. The coil component according to claim 13, wherein the cover member has a flange, and the flange outwardly extends from a bottom end of the side circumferential wall of the cover member, and
a lower surface of the flange is in surface contact with the bobbin.

15. The coil component according to claim 2, wherein the cover member has a side circumferential wall, and the side circumferential wall includes a first wall part and a second wall part facing each other,
the bobbin has a first side surface and a second side surface outwardly opposite to each other, the first side surface is arranged along the first wall part, and the second side surface is arranged along the second wall part,
the first wall part has the spring piece, and the first side surface has the convex part and the recessed part, and
the second wall part and the second side surface are respectively formed to be flat and are in surface contact with each other.

16. The coil component according to claim 15, wherein the cover member has a flange, and the flange outwardly extends from a bottom end of the side circumferential wall of the cover member, and
a lower surface of the flange part is in surface contact with the bobbin.

17. The coil component according to claim 3, wherein the cover member has a side circumferential wall, and the side circumferential wall includes a first wall part and a second wall part facing each other,
the bobbin has a first side surface and a second side surface outwardly opposite to each other, the first side surface is arranged along the first wall part, and the second side surface is arranged along the second wall part,
the first wall part has the spring piece, and the first side surface has the convex part and the recessed part, and
the second wall part and the second side surface are respectively formed to be flat and are in surface contact with each other.

18. The coil component according to claim 17, wherein the cover member has a flange, and the flange outwardly extends from a bottom end of the side circumferential wall of the cover member, and
a lower surface of the flange part is in surface contact with the bobbin.

* * * * *